(12) United States Patent
Sakanashi et al.

(10) Patent No.: US 6,460,764 B1
(45) Date of Patent: Oct. 8, 2002

(54) CARD EXCHANGING DEVICE, CARD EXCHANGING METHOD, AND RECORDING MEDIA

(75) Inventors: Tatsuya Sakanashi; Misora Imai; Yoshinori Hosoe; Yumiko Abe, all of Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/852,278

(22) Filed: May 10, 2001

(30) Foreign Application Priority Data

May 11, 2000 (JP) ........................... 2000-139075

(51) Int. Cl.[7] ................................ G06K 5/00
(52) U.S. Cl. ........................ 235/380; 235/382
(58) Field of Search .................. 235/379, 380, 235/382, 383; 705/43, 1; 345/330, 332

(56) References Cited

U.S. PATENT DOCUMENTS

| | | | | |
|---|---|---|---|---|
| 5,393,964 A | * | 2/1995 | Hamilton et al. | 235/381 |
| 5,604,341 A | * | 2/1997 | Grossi et al. | 235/379 |
| 5,717,863 A | * | 2/1998 | Adamson et al. | 395/200.34 |
| 5,995,096 A | * | 11/1999 | Kitahara et al. | 345/330 |
| 6,134,223 A | * | 10/2000 | Burke et al. | 370/265 |
| 6,181,736 B1 | * | 1/2001 | McLaughlin et al. | 375/222 |
| 6,205,716 B1 | * | 3/2001 | Peltz | 52/36.2 |
| 6,223,983 B1 | * | 5/2001 | Kjonaas et al. | 235/379 |

FOREIGN PATENT DOCUMENTS

| | | |
|---|---|---|
| JP | 5-323990 | 12/1993 |
| JP | 8-329017 | 12/1996 |
| JP | 11-175718 | 7/1999 |
| JP | 11-232196 | 8/1999 |

* cited by examiner

Primary Examiner—Michael G. Lee
Assistant Examiner—Ahshik Kim
(74) Attorney, Agent, or Firm—Wenderoth, Lind & Ponack, L.L.P.

(57) ABSTRACT

A display of a card exchange device is split by a split line according to the number of card exchange persons and their seating state, and each card data is displayed in an area of a position corresponding to the seating state. Accordingly, an electronic card exchange device that is effective in business talks just after the card exchange can be provided.

34 Claims, 14 Drawing Sheets

11,12,13 : card exchange device

CARD EXCHANGING DEVICE, CARD EXCHANGING METHOD, AND RECORDING MEDIA

FIELD OF THE INVENTION

The present invention relates to an information exchange technique and, more particularly, to a technique for smoothly performing business talks and the like after card exchange when cards are exchanged with plural persons in a portable electronic card exchange device.

BACKGROUND OF THE INVENTION

Conventional electronic card exchange devices or methods are constituted so as to exhibit effects on solving the inconvenience in management after business talks, troubles in searching, or erroneous inputs on the electronization, which are demerits of the card exchange by means of paper mediums, or on manpower saving. For example, there are already disclosed a device which uses an IC card in Japanese Published Patent Application No. Hei. 11-232196, and a device which uses a radio technique in Japanese Published Patent Application No. Hei. 8-329017. Since data are electronified and exchanged in an electronic way, it is certainly possible to automatically insert more abundant various data such as face image data or the date of card exchange, as compared with the case of paper mediums. Further, when URL information on the Internet is included in data, more detailed and enormous amounts of information can be obtained.

However, the conventional electronic card exchange device or method has for its primary object to easily obtain a large amount of information and simplify the subsequent management, and does not consider the use of data in business talks or the like at the card exchange. When the business talk is made with one person, electronically received data corresponds to that person in a one-to-one relationship. However, in a case where the business talk is made with plural persons, when data are only received, the data and the persons do not correspond to each other and thus the user has to memorize the names of all the persons at the card exchange to make the business talk smoothly.

Further, it is commonly possible to remember a certain number of names for a while from greetings at the card exchange, but thereafter they may be forgotten. Even when the face image data are received at the card data exchange time, it is difficult to display the face image data and names of many persons simultaneously on a small portable display part, and thus it is difficult to make a smooth business talk while the face image data and information such as names are being successively displayed and learned.

SUMMARY OF THE INVENTION

The present invention is made to solve the above-mentioned problems and has for its object to provide a card exchange device and a card exchange method, which can easily carry out electronic card exchanges with plural persons, simplify the storage and management of a large amount of card data, and smoothly carry out the card exchange itself as well as a business talk after the card exchange.

According to a first aspect of the present invention, there is provided a card exchange device which exchanges card data with plural devices in an electronic way comprising: a card data display means for simultaneously displaying part or all of the received card data of each person by plural persons on a display screen, at a time of card exchange; and a specification means for specifying an order and a position of the card data displayed by the card data display means.

According to the present invention, the seating state after the card exchange and the display of the card data positionally correspond to each other, whereby disagreement between a person and his card data can be prevented, and business talks can be made smoothly under correct recognition.

According to a card exchange device of a second aspect of the present invention, the card exchange device according to the first aspect comprises: a card data receiving means for receiving card data at the time of card exchange; a card data storage means for storing the card data received by the card data receiving means by the number of persons with whom cards have been exchanged; a specification means for specifying required data to be displayed among the card data which are stored in the card data storage means as well as specifying an order and a position of displaying the required card data to be displayed; and a card data display means for displaying the data to be displayed, which are specified by the specification means, on the display screen.

According to the present invention, the positional correspondence between the seating state after the card exchange and the display of the card data are automatically made, whereby disagreement between a person and his card data can be prevented, and business talks can be made smoothly under correct recognition.

According to a card exchange device according to a third aspect of the present invention, the card exchange device according to the second aspect comprises: a card data receiving means for receiving attribute data information about a person himself, such as a name, an address, a division, a telephone number, a name of a belonging group, and a post, as well as face image data as card data, at a time of card exchange; a seating state image taking means for taking an image of a seating state of partners with whom cards have been exchanged for the number of times not exceeding the number of partners with whom cards have been exchanged, after the card exchange, so as to include the face images of all the card exchange partners; a judgement means for judging a seating position of a card exchange partner from the face image data received by the card data receiving means and the face images taken by the seating state image taking means; and a means for making the seating position of the card exchange partner judged by the judgement means and a display position of the card data to be displayed on the display screen correspond to each other.

According to the present invention, the seating state after the card exchange and the display of the card data are automatically made correspond positionally to each other to reduce the operation after the card exchange, whereby business talks can be made more smoothly with concentration.

According to a card exchange device of a fourth aspect of the present invention, the card exchange device according to the second aspect comprises: a seating state image taking means for taking an image of a seating state of partners with whom cards have been exchanged for the number of times not exceeding the number of partners with whom cards have been exchanged, after the card exchange, so as to include face images of all the card exchange partners; a face image taking means for taking face images of the card exchange partners at the time of card exchange; a judgement means for judging a seating position of a card exchange partner from the face image taken by the face image taking means and the face images taken by the seating state image taking means; and a means for making the seating position of the card exchange partner judged by the judgement means and a display position of the card data to be displayed on the display screen correspond to each other.

According to the present invention, in a person judgement process for automatically making the positional correspondence between the seating state after the card exchange and the display of the card data, not a complicated judgement means for feature extraction and pattern recognition and the like but a simple and high-accuracy judgement means for mere normalization and comparison of the agreement amount can be realized.

According to a card exchange device of a fifth aspect of the present invention, the card exchange device according to the second aspect comprises: a card-unexchanged mark display means for, when there is a partner whose card data to be displayed does not exist because cards are not exchanged, displaying a mark indicating that cards are not exchanged yet on the display screen correspondingly to a seating position of the partner.

According to the present invention, even when there is a partner with whom cards are not exchanged this time on the ground that card exchange was already performed in the past or the like, the seating state after the card exchange and the display of the card data positionally correspond to each other, whereby disagreement between a person and his card data can be prevented, and business talks can be made smoothly under correct recognition.

According to a card exchange device of a sixth aspect of the present invention, the card exchange device of the second aspect comprises: a card exchange date/time storage means for storing a date and a time when the card data storage means stores card data of card exchange partners, at the time of the card exchange; a means for reading both of the card data stored in the card data storage means and the date/time data stored in the card exchange date/time storage means as required; a reading mark display means for, when part or all of the read card data are displayed by the card data display means on the display screen, displaying a mark indicating that the card data were read from the card data storage means; and a means for changing the mark which is displayed by the reading mark display means according to the card exchange date/time, on the basis of the read date/time data.

According to the present invention, even when there is a partner with whom cards were already exchanged in the past and are not exchanged this time, the seating state after the card exchange and the display of the card data positionally correspond to each other, whereby disagreement between a person and his data can be prevented, and the possibility that already obtained card data are old is indicated, thereby encouraging to perform card exchange again, and business talks can be made smoothly on the basis of data as new as possible.

According to a seventh aspect of the present invention, there is provided a card exchange device which exchanges card data with plural devices in an electronic way comprising: a card data receiving means for receiving attribute data information about a person himself, such as a name, an address, a division, a telephone number, a name of a belonging group, and a post as card data, at a time of card exchange; a card data storage means for storing the card data received by the card data receiving means by the number of persons with whom cards have been exchange; a specification means for specifying required data to be displayed among the card data stored in the card data storage means as well as specifying an order and a position of displaying the required card data to be displayed; a card data display means for displaying the data to be displayed, which are specified by the specification means, on a display screen; a seating state image taking means for taking an image of a seating state of partners with whom cards have been exchanged for the number of times not exceeding the number of partners with whom cards have been exchanged, after the card exchange, so as to include face images of all the card exchange partners; a means for cutting out a face image of each person from the images taken by the seating state image taking means; a face image storage means for storing the cutout face image; and a means for making the cutout face image and the card data stored in the card data storage means correspond to each other.

According to the present invention, there is no need to exchange face image data which are a large amount of data, at the time of card exchange, nor to take face image data at every card exchange, whereby face image data can be obtained with performing the card exchange smoothly.

According to a card exchange device of an eighth aspect of the present invention, in the card exchange device according to the second aspect, the card data display means displays part of the received card data of each person by plural persons on only a part of the display screen and displays part or all of card data of a specified card exchange partner on the rest of the display screen.

According to the present invention, when there are so many persons with whom cards have been exchanged that much data cannot be displayed on the display screen of the card exchange device, part of card data of all the persons are displayed on a part of the screen correspondingly in position as well as data of a speaker are selectively displayed on the rest of the display part, thereby obtaining the same effect as that in a case where data of all the persons are displayed correspondingly in position, that is, making a person and his card data correspond correctly to each other and obtaining detailed information when needed, whereby business talks can be made smoothly under correct recognition.

According to a card exchange device of a ninth aspect of the present invention, the card exchange device of the eighth aspect comprises: a standard data storage means for storing voice data of a card exchange partner as standard data; and a speaker recognition means for recognizing a speaker from the standard data stored in the standard data storage means and voice data of the speaker, and the card data display means selects required data to be displayed among card data of the speaker recognized by the speaker recognition means and displays the required data on the display screen.

According to the present invention, data of a speaker can be selectively displayed by a simple operation.

According to a card exchange device of a tenth aspect of the present invention, the card exchange device of the ninth aspect comprises: a voice data storage means for storing voice data used when a speaker is recognized by the speaker recognition means or other voice data.

According to the present invention, it is easy to remember the situation at the card exchange or memories for card exchange partners from contents of the voice data, ways of speaking, peculiarity in speech or the like, even after a long time has passed from the card exchange, and the same effect as that in a case where face image data are stored can be obtained, whereby an approach to the next card exchange partner can be performed smoothly.

According to an eleventh aspect of the present invention, there is provided a card exchange method which exchanges card data with plural devices in an electronic way comprising: a card data receiving step of receiving card data at a time of card exchange; a card data storage step of storing the card data received in the card data receiving step by the number of persons with whom cards have been exchanged; a specification step of specifying required data to be displayed among the card data stored in the card data storage step as well as specifying an order and a position of displaying the required card data to be displayed; and a card data display step of displaying the data to be displayed, which are specified in the specification step, on a display screen.

According to the present invention, the seating state after the card exchange and the display of the card data positionally correspond to each other, whereby disagreement between a person and his card data can be prevented, and business talks can be made smoothly under correct recognition.

According to a card exchange method of a twelfth aspect of the present invention, the card exchange method of the eleventh aspect comprises: a card data receiving step of receiving attribute data information about a person himself, such as a name, an address, a division, a telephone number, a name of a belonging group, and a post, as well as face image data as card data, at a time of card exchange; a seating state image taking step of taking an image of a seating state of partners with whom cards have been exchanged for the number of times not exceeding the number of partners with whom cards have been exchanged, after the card exchange, so as to include face images of all the card exchange partners; a judgement step of judging a seating position of a card exchange partner from the face image data received in the card data receiving step and the face images taken in the seating state image taking step; and a step of making the seating position of the card exchange partner judged in the judgement step and the display position of the card data to be displayed on the display screen correspond to each other.

According to the present invention, the positional correspondence between the seating state after the card exchange and the display of the card data are automatically made to reduce the operation after the card exchange, whereby business talks can be made more smoothly with concentration.

According to a card exchange method of a thirteenth aspect of the present invention, the card exchange method of the eleventh aspect comprises: a seating state image taking step of taking an image of a seating state of partners with whom cards have been exchanged for the number of times not exceeding the number of partners with whom cards have been exchanged, after the card exchange, so as to include face images of all the card exchange partners; a face image taking step of taking face images of the card exchange partners at the time of card exchange; a judgement step of judging a seating position of a card exchange partner from the face image taken in the face image taking step and the face images taken in the seating state image taking step; and a step of making the seating position of the card exchange partner judged in the judgement step and the display position of the card data to be displayed on the display screen correspond to each other.

According to the present invention, in a person judgement process for automatically making the positional correspondence between the seating state after the card exchange and the display of the card data, not a complicated judgement means for feature extraction and pattern recognition and the like but a simple and high-accuracy judgement means for mere normalization and comparison of the agreement amount can be realized.

According to a card exchange method of a fourteenth aspect of the present invention, the card exchange method as defined in the eleventh aspect comprises: a card-unexchanged mark display step of, when there is a partner whose card data to be displayed does not exist because cards are not exchanged, displaying a mark indicating that cards are not exchanged yet, on the display screen correspondingly to a seating position of the partner.

According to the present invention, even when there is a partner with whom cards are not exchanged this time on the ground that card exchange was already performed in the past or the like, the seating state after the card exchange and the display of the card data positionally correspond to each other, whereby disagreement between a person and his data can be prevented, and business talks can be made smoothly under correct recognition.

According to a card exchange device of a fifteenth aspect of the present invention, the card exchange method of the eleventh aspect comprises: a card exchange date/time storage step of storing a date and a time when card data of a card exchange partner are stored in the card data storage step, at the time of card exchange; a step of reading both of the card data stored in the card data storage step and the date/time data stored in the card exchange date/time storage step as required; a reading mark display step of, when part or all of the read card data are displayed on the display screen in the card data display step, displaying a mark indicating that the card data were read from the card data storage step; and a step of changing the mark which is displayed in the reading mark display step according to the card exchange date/time on the basis of the read date/time data.

According to the present invention, even when there is a partner with whom cards were already exchanged in the past and are not exchanged this time, the seating state after the card exchange and the display of the card data positionally correspond to each other, whereby disagreement between a person and his data can be prevented, and the possibility that already obtained card data are old is indicated, thereby encouraging to perform card exchange again, and business talks can be made smoothly on the basis of data as new as possible.

According to a sixteenth aspect of the present invention, there is provided a card exchange method which exchanges card data with plural devices in an electronic way comprising: a card data receiving step of receiving attribute data information about a person himself, such as a name, an address, a division, a telephone number, a name of a belonging group, and a post as card data, at a time of card exchange; a card data storage step of storing the card data received in the card data receiving step by the number of persons with whom cards have been exchanged; a specification step of specifying required data to be displayed among the card data stored in the card data storage step as well as specifying an order and a position of displaying the required card data to be displayed; a card data display step of displaying the data to be displayed, which are specified in the specification step, on a display screen; a seating state image taking step of taking an image of a seating state of partners with whom cards have been exchanged for the number of times not exceeding the number of partners with whom cards have been exchanged, after the card exchange, so as to include face images of all the card exchange partners; a step of cutting out a face image of each person from the images taken in the seating state image taking step; a face image storage step of storing the cutout face image; and a step of making the cutout face image and the card data stored in the card data storage step correspond to each other.

According to the present invention, there is no need to exchange face image data which are a large amount of data, at the time of card exchange, nor to take face image data at every exchange, whereby face image data can be obtained with performing the card exchange smoothly.

According to a card exchange method of a seventeenth aspect of the present invention, in the card exchange method of the eleventh aspect, part of the received card data of each person are displayed by plural persons on only a part of the display screen and part or all of the card data of a specified card exchange partner are displayed on the rest of the display screen, in the card data display step.

According to the present invention, when there are so many persons with whom cards have been exchanged that much data cannot be displayed on the display screen of the card exchange device, part of card data of all the persons are displayed on a part of the screen correspondingly in position as well as data of a speaker are selectively displayed on the rest of the display part, thereby obtaining the same effect as that in a case where data of all the persons are displayed correspondingly in position, that is, making a person and his card data correspond correctly to each other and obtaining detailed information when needed, whereby business talks can be made smoothly under correct recognition.

According to a card exchange method of an eighteenth aspect of the present invention, the card exchange method of the seventeenth aspect comprises: a standard data storage step of storing voice data of a card exchange partner as standard data; and a speaker recognition step of recognizing a speaker from the standard data stored in the standard data storage step and voice data of the speaker, and required data to be displayed are selected among card data of the speaker recognized in the speaker recognition step and displayed on the display screen, in the card data display step.

According to the present invention, data of a speaker can be selectively displayed by a simple operation.

According to a card exchange method of a nineteenth aspect of the present invention, the card exchange method of the eighteenth aspect comprises: a voice data storage step of storing voice data used when the speaker is recognized in the speaker recognition step or other voice data.

According to the present invention, it is easy to remember the situation at the card exchange or memories for card exchange partners from contents of the voice data, ways of speaking, peculiarity in speech or the like, even after a long time has passed from the card exchange, and the same effect as that in a case where face image data are stored can be obtained, whereby an approach to the next card exchange partner can be performed smoothly.

A recording medium of a twentieth aspect of the present invention contains a program for making a computer execute each step defined in the eleventh aspect.

A recording medium of a twenty-first aspect of the present invention contains a program for making a computer execute each step defined in the eleventh or twelfth aspect.

A recording medium of a twenty-second aspect of the present invention contains a program for making a computer execute each step defined in any of the eleventh, twelfth, and thirteenth aspects.

A recording medium of a twenty-third aspect of the present invention contains a program for making a computer execute each step defined in the eleventh or fourteen aspect.

A recording medium of a twenty-fourth aspect of the present invention contains a program for making a computer execute each step defined in the eleventh or fifteenth aspect.

A recording medium of a twenty-fifth aspect of the present invention contains a program for making a computer execute each step defined in the sixteenth aspect.

A recording medium of a twenty-sixth aspect of the present invention contains a program for making a computer execute each step defined in the eleventh or seventeenth aspects.

A recording medium of a twenty-seventh aspect of the present invention contains a program for making a computer execute each step defined in any of the eleventh, seventeenth, and eighteenth aspects.

A recording medium of a twenty-eighth aspect of the present invention contains a program for making a computer execute each step defined in any of the eleventh, seventeenth, eighteenth, and nineteenth aspects.

DETAILED DESCRIPTION OF THE PREFERRED EMBODIMENTS

Hereinafter, embodiments of the present invention will be described with reference to the drawings.

(Embodiment 1)

Hereinafter, a card exchange device and a card exchange method according to a first embodiment will be described with reference to FIGS. 1 to 4.

Figure 1:
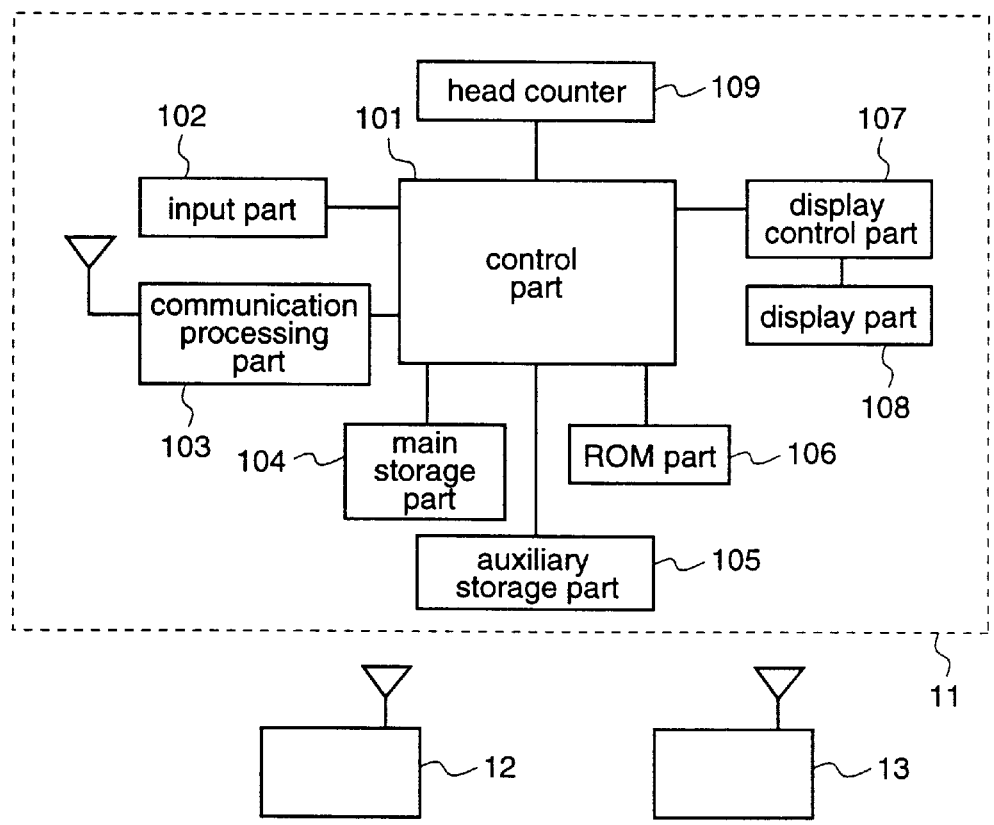
FIG. 1 is a block diagram illustrating hardware of a card exchange device according to a first embodiment of the present invention.

FIG. 1 is a block diagram illustrating hardware of a card exchange device 11 according to the first embodiment.

In FIG. 1, the card exchange device 11 exchanges card data and other data in an electronic way with other card exchange devices 12 and 13 which have the same components.

A control part 101 controls the whole card exchange device.

An input part 102 receives an instruction of a user.

A communication processing part 103 performs a radio communication processing, and exchanges card data and other data with a card exchange device of a card exchange partner. The communication processing part 103 receives attribute data concerning that person such as name, address, division, telephone number, name of the belonging group, and post, or face image data, as the card data at the card exchange time.

A main storage part 104 and an auxiliary storage part 105 hold the received card data. Here, the auxiliary storage part 105 needs to hold data or a program even when the power is OFF, and thus a nonvolatile semiconductor memory such as a flash memory, or a magnetic storage device such as a HDD is employed. The auxiliary storage part 105 contains card data and other data obtained by the previous card exchanges, while of course the user's own data for card exchange and a program group for controlling the whole card exchange device 11 are also contained. A basic processing program is stored in a ROM part 106 and, when the power is ON, the processing is started by the program stored in the ROM part 106. However, a program which is not stored in the ROM part 106 can be read from the auxiliary storage part 105 to the main storage part 104 and executed as required.

A display control part 107 temporarily retains display data as well as performs a control required for display, in accordance with an instruction from the control part 101. A display part 108 displays card data and other data in accordance with the control of the display control part 107. In a case where the card data is displayed on a display screen, required data to be displayed among the stored card data, and the order and the position of displaying the required data to be displayed are specified by the input part 102, and the display part 108 displays the specified display data on the display screen under the control of the display control part 107.

A head counter 109 counts the number of persons with whom cards have been exchanged. Here, as the head counter 109, a register of a CPU in the control part 101 or a variable area which is set at an appropriate address in the main storage part 104 may be used, whereby no special hardware is required.

Figure 2:
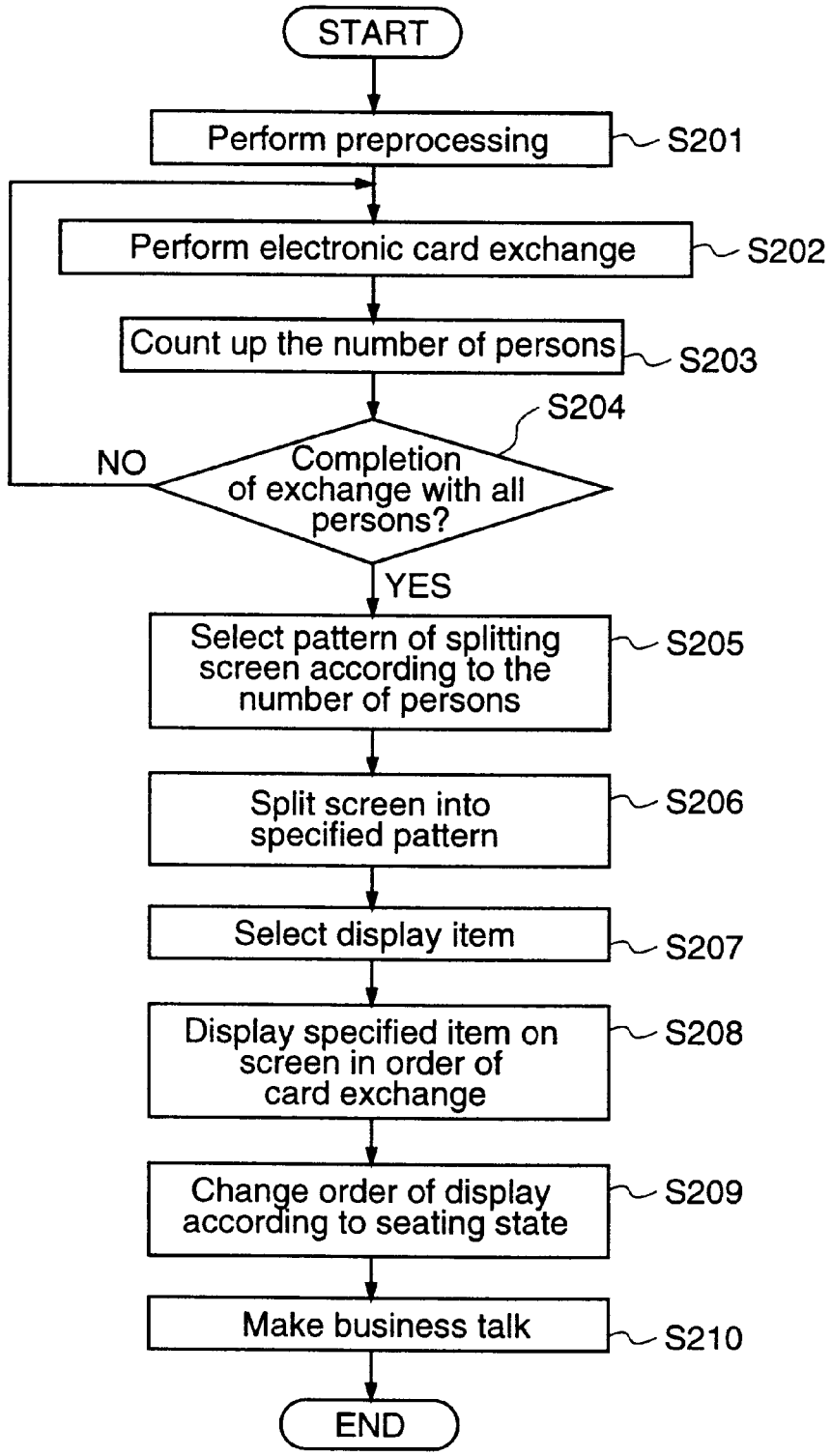
FIG. 2 is a flowchart showing a processing procedure of the card exchange device according to the first embodiment of the invention.

A flow of the card exchange in the card exchange device 11 constructed as described above will be described with reference to FIGS. 1 and 2. FIG. 2 is a flowchart showing a processing procedure of the card exchange device 11 according to the first embodiment. When the power switch of the card exchange device 11 is turned ON, a preprocessing is initially performed (Step S201). In Step S201, the control part 101 executes the program stored in the ROM part 106. In accordance with a command of this program, the user own card data are read from the auxiliary storage part 105 to the main storage part 104. Further, the head counter 109 is cleared to zero. Next, a card exchange is performed electronically with a card exchange partner (Step S202). At the time of card exchange, the control part 101 controls the communication processing part 103 to perform radio communication for example with the card exchange device 12, and transfers the user own card data to the card exchange device 12 as well as reads card data of the partner into the main storage part 104. Next, the head counter 109 is counted up every time a card exchange with one person is completed (Step S203). Then, the processing returns to Step S202 to perform a card exchange again until card exchanges with all persons are completed (Step S204). When the card exchange processing is performed for a required number of times and the card exchanges are completed, the number of partners with whom cards have been exchanged is counted in the head counter 109. Here, the card data of the partners in the main storage part 104 are successively stored in the auxiliary storage part 105 after the card exchanges have been completed or during intervals while the card exchange is being performed. When the card data are stored in the auxiliary storage part 105, a storage address list table which is required for reading the stored card data is created in the main storage part 104, as described later.

Figure 3:
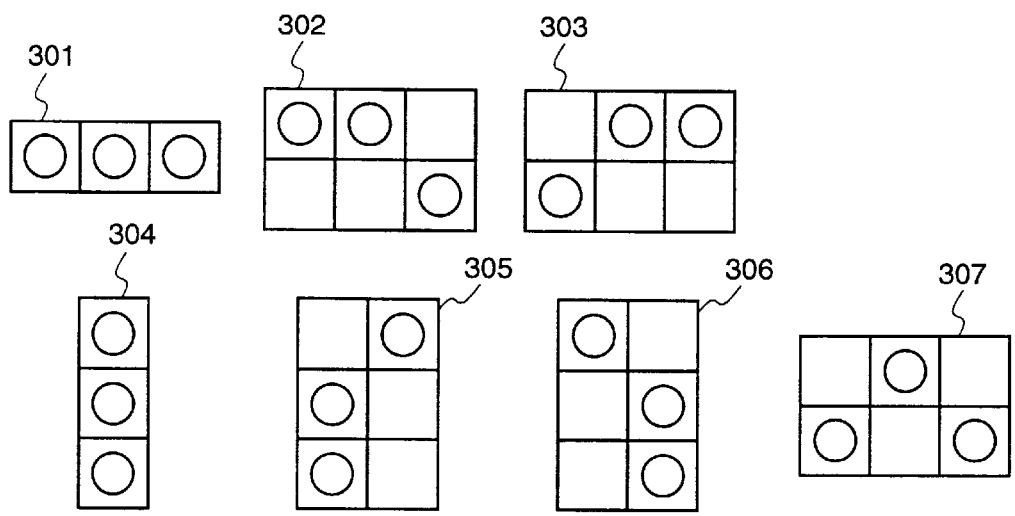
FIG. 3 is a diagram illustrating examples of a seating pattern according to the first embodiment of the invention.

Next, a display processing after the card exchange has been completed will be described with reference to FIGS. 2, 3 and 4. First, the display part 108 displays seating patterns by the number of partners, which are previously stored in the auxiliary storage part 105, on the basis of the number in the head counter 109, on a display screen under a control of the display control part 107 (Step S205). It is obvious that the control of the display control part 107 is always required when the display is performed by the display part 108, and thus a description concerning the display control part 107 will be omitted hereinafter. In this first embodiment, to simplify the description, it is supposed that card exchanges are performed with three partners. FIG. 3 shows examples of the seating pattern in the case where card exchanges are performed with three partners. Several conceivable seating patterns are previously prepared in the case of three partners, such as seating pattern 301 in which three persons are seated opposite in a line, seating pattern 302 in which two out of three are seated in opposed positions and one is seated alongside on the right, seating pattern 303 in which two are seated in opposed positions and one is seated alongside on the left, and seating patterns 304 to 307 as shown in FIG. 3. In the first embodiment, it is supposed that three persons are seated opposite in a line. In this case, the seating pattern 301 is selected from the input part 102. Next, the display part 108 displays a display splitting line 401 on the display screen for software-splitting the screen according to the specified seating pattern (Step S206). At this point of time, it can be judged how much extent of display is possible on card data display (described later), from the screen size and the number of splits. Next, data items to be displayed among the card data and other data on the display screen are specified from the input part 102 (Step S207). In practice, while attribute data, face image data and the like are properly displayed as the card data, unnecessary ones are deleted, thereby arranging the screen layout. Next, only the specified items to be displayed are read form the auxiliary storage part 105 into the main storage part 104 by referring to the storage address list table in the main storage part 104, and are displayed by the display part 108 on the display screen in the order of card exchanges (Step S208). At this point in time, the data are merely displayed in the order of card exchanges, and thus the seating state and the display positions do not always correspond to each other. Then, the display positions of the card data are specified from the input part 102 and are changed to appropriate positions (Step S209). When the specification is made by dragging and dropping the data by employing a pointing device such as pen, a cross key or the like, the positions can be easily changed.

Figure 4:
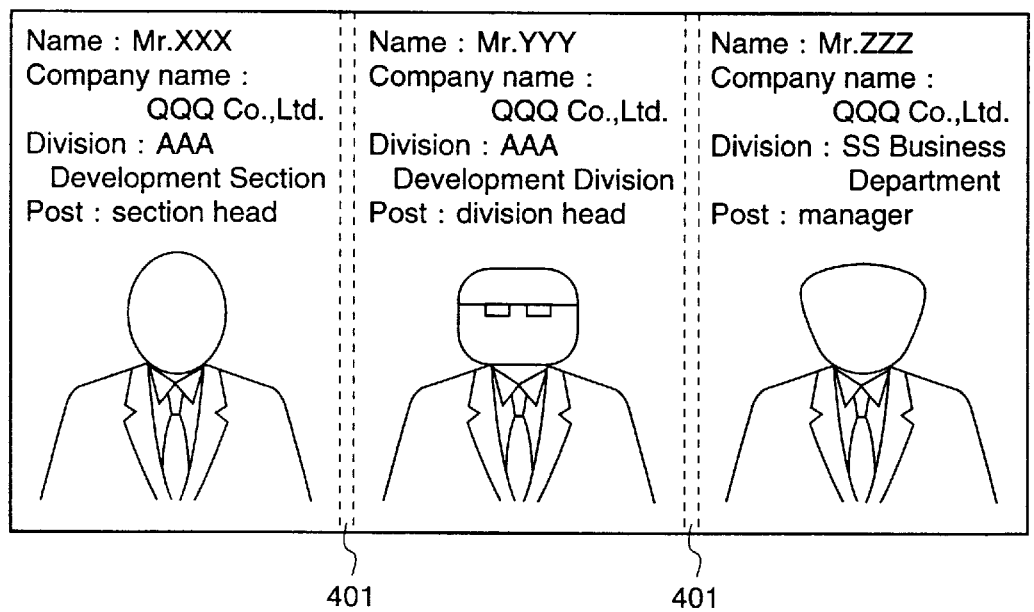
FIG. 4 is a diagram illustrating an example of a display of the card exchange device according to the first embodiment of the invention.

FIG. 4 shows an example of a display of three persons who performed card exchanges, by the display part 108. In FIG. 4, since the display splitting line 401 is a line for software-splitting the screen, it is desirable that the line should have a certain width for facilitating the dragging and dropping at the time of position change.

As described above, according to the card exchange device of the first embodiment, the communication processing part 103 receives attribute data concerning the person such as name, address, division, telephone number, name of the belonging group, and post, or face image data as the card data at the time of card exchange, the main storage part 104 and the auxiliary storage apart 105 hold the received card data, required data to be displayed among the stored card data, and the order and the position of displaying the required data to be displayed are specified from the input part 102, and then the display part 102 displays the specified display data on the display screen. Accordingly, the seating state and the display of card data items of card exchange partners can be matched, whereby the correct correspondence between the partners and the card data enables smooth business talks after the card exchanges.

Further, while in the first embodiment the communication processing part 103 exchanges card data or other data with a card exchange device of a card exchanging partner by a radio communication processing, the present invention is not restricted thereto and any method such as infrared ray communication and cable communication can be employed as long as it is functionally equivalent.

(Embodiment 2)

A card exchange device and a card exchange method according to a second embodiment will be described with reference to FIGS. 5 and 6.

Figure 5:
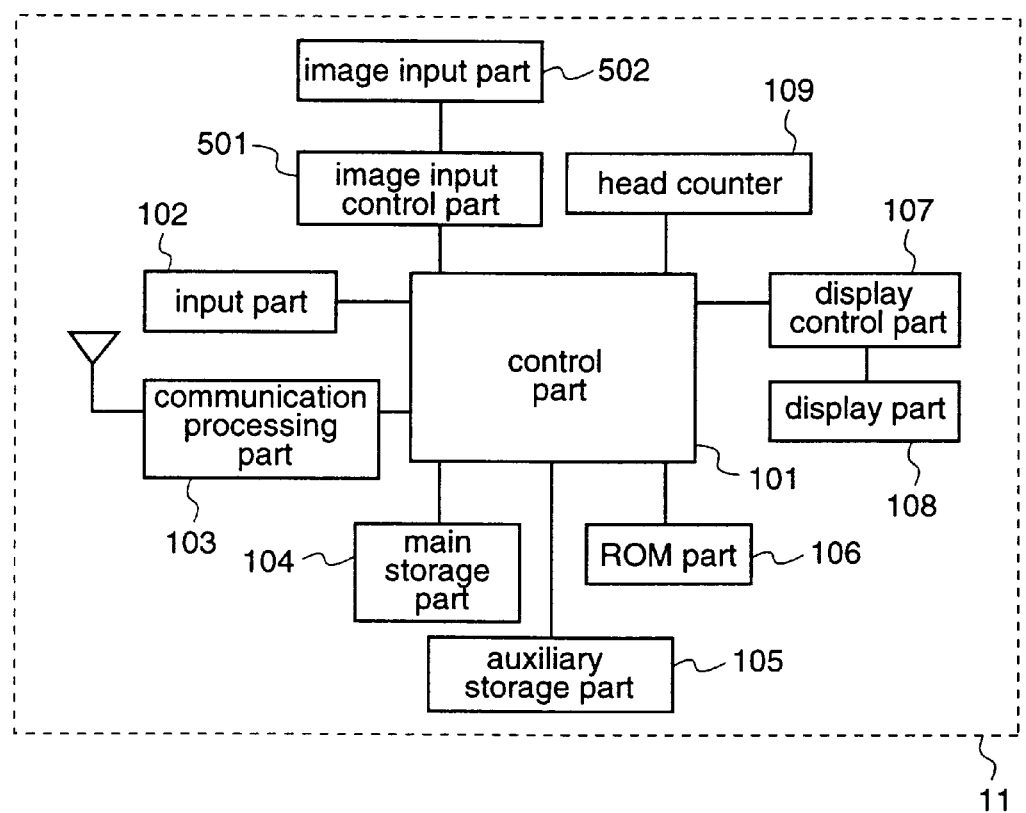
FIG. 5 is a block diagram illustrating hardware of a card exchange device according to a second embodiment of the present invention.

FIG. 5 is a block diagram illustrating hardware of a card exchange device 11 according to the second embodiment. In the figure, the same reference numerals as those in FIG. 1 denote the same or corresponding components, and their descriptions will be omitted.

In the second embodiment, after card exchanges, under control of an image input control part 501, an image input part 502 takes an image of the seating state of partners with whom the cards have been exchanged for the number of times not exceeding the number of persons with whom the cards have been exchanged, so as to include face images of all the card exchange partners. Since it is obvious that the control of the image input control part 501 is required when an image is inputted from the image input part 502, a description concerning the image input control part 501 will be omitted in the following description.

Further, the control part 101 judges the seating position of a card exchange partner from face image data received at the card exchange time and the face image which has been taken at the seating state image taking time, as well as makes the judged seating position of the card exchange partner and the display position of the card data to be displayed on the display screen correspond to each other.

Hereinafter, the operation of the card exchange device 11 that is constructed as described above will be described with reference to FIGS. 5 and 6. FIG. 6 is a flowchart showing a processing procedure of the card exchange device according to the second embodiment.

Figure 6:
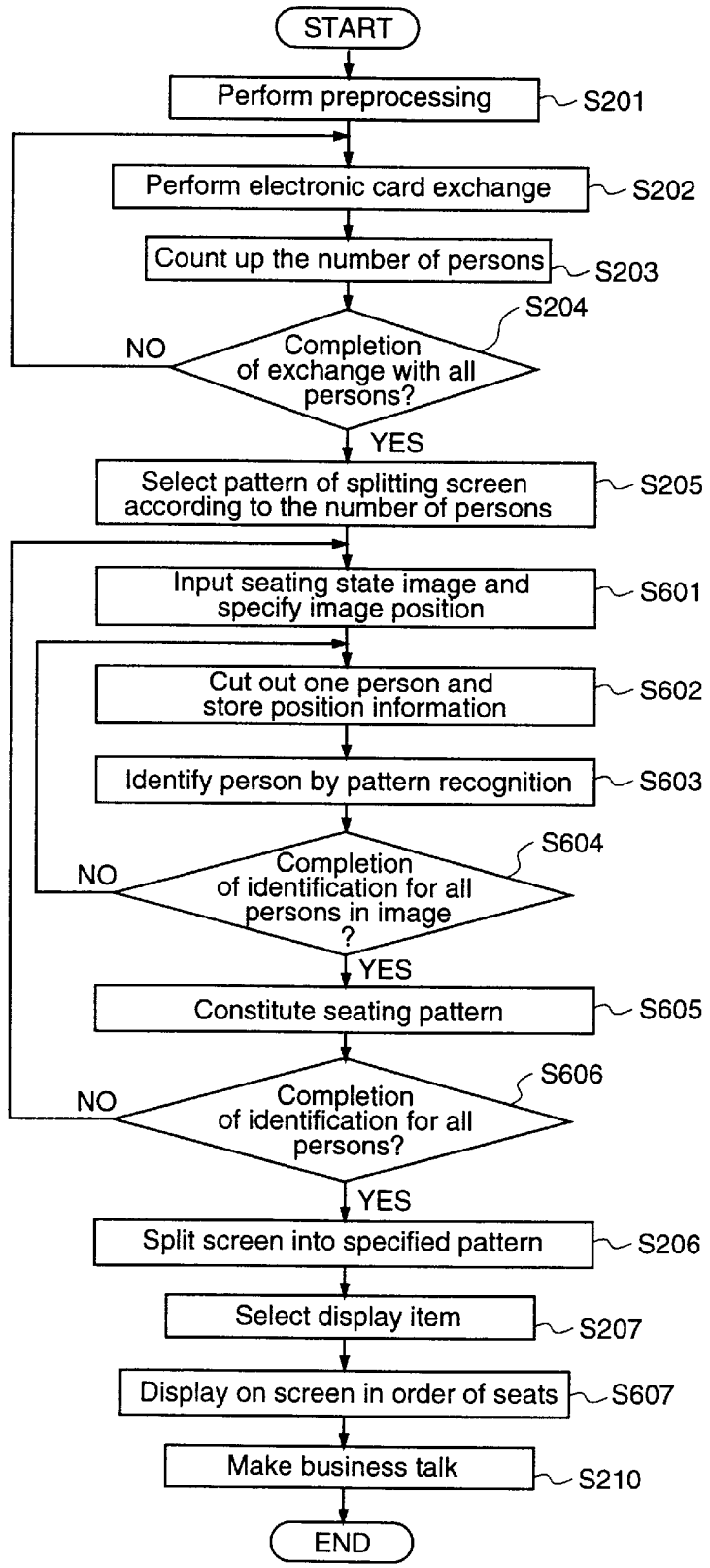
FIG. 6 is a flowchart showing a processing procedure of the card exchange device according to the second embodiment of the invention.

In FIG. 6, since the processes from Steps S201 to S205 are the same as those in FIG. 2, their descriptions will be omitted. In the second embodiment, however, the processing in Step S202 is performed so that the face image data are always exchanged together with the attribute data as card data at the card exchange time. Here, the face image data represent mere image data and can be exchanged in a common way such as radio communication as the attribute data such as name and division, whereby no special device is required.

Next, after the partner with whom the card was exchanged has been seated, an image that represents the seating state is inputted from the image input part 502 and stored in the auxiliary storage part 105 through the main storage part 104 (Step S601). The inputted image that represents the seating state is desirably a front image because it is employed to recognize the face image data as described later, and further it is actually difficult to correctly extract a front-and-rear and right-and-left relation in a complicated seating state from one image. Thus, in order to simplify the processing, images of parts where persons are in line are taken as images of the seating state. For example, when there are three persons seated on one left and three seated on one right, it is necessary to perform the image taking twice in total, once on the left and once on the right. At the image taking, it is specified which part of the whole seating state pattern inputted in Step S205 is taken.

Next, a person cut-out program that is stored in the auxiliary storage part 105 is read into the main storage part 104 and executed, thereby reading the seating state image stored in the auxiliary storage part 105 into the main storage part 104 as required while cutting out data of one person from the seating state image (Step S602). Retrieval in the image for person cutout is performed for example from the upper left toward the right and further downwardly. In this case, it does not matter where the retrieval is started, but the positional relationship of respective cutout persons is important. Thus, the center coordinates of a face image are stored at cutting out to know its arrangement order later. The cutting-out of a person usually means cutting-out of a face image, and many extraction methods are known such as an eigenspace method, a subspace method and a template matching method. While also in the following description there is a case where a processing program is read from the auxiliary storage part 105 into the main storage part 104 and executed, it is not an essential issue and thus its description will be omitted. Next, a person identification processing on the basis of pattern recognition is performed (Step S603). The person identification processing on the basis of pattern recognition is performed by comparing the face image data received at the card exchange with the face image data that has been cut out in Step S602. Here, it is expected that the face image data that was previously prepared for the card exchange may be different in face itself due to changes over time from the image taking, in hair style, and in facial expression or direction of the face. Therefore, the feature extraction and pattern recognition is performed by employing a method of extracting the quantity of feature of a target person to be recognized and performing the person identification, which method has been already reported for example in Japanese Published Patent Application No. Hei. 11-175718. Then, the processing returns to Step S602 to repeat person cutting-out and person identification until the processing is completed for all persons in the image (S604). Since the person cutting-out program has already been read, it is not read again. Next, the seating order is decided by employing the center coordinates of the cutout face image (Step S605). As described above, the seating image is taken only in line. Therefore, this is a processing for only deciding the order in a lateral direction employing the center coordinates of the cutout face image. As described in Step S601, since the seating state pattern to which the whole seating state corresponds is already known in this step, when the seating order is decided, it is known who is seated at which position in the whole seating state. Thereafter, the processing returns to Step S601 as required to repeat the processing by the number of persons counted in the head counter 109 (Step S606). Since it is known by the above-mentioned processing who is seated at which position, the subsequent processing comprises software-splitting the screen according to the seating pattern (Step S206) and specifying items to be displayed (Step S207), as described above. In the next Step S607, the card data is displayed. In this case, the card data of the card exchange partner is displayed at a position corresponding to the seating state by examining the person identification result from the beginning, not in the order of the card exchange like in the description of Step S208 in the first embodiment. Of course, when there is an error in the person identification, it can be corrected manually at this point in time. In this case, the processing in Step S209 in FIG. 2 which is described in the first embodiment can be performed.

As described above, according to the card exchange device of the second embodiment, after cards are exchanged, an image of the seating state of partners with whom the cards have been exchanged is taken by the image input part 102 for the number of times which does not exceed the number of partners with whom the cards have been exchanged so as to include face images of all the card exchange partners, and at the card exchange, the control part 101 judges the seating position of the card exchange partner from the received face image data and the face images taken when the seating state image was taken, as well as makes the display position of card data to be displayed on the display screen correspond to the judged seating position of the card exchange partner. Therefore, the seating state of the card exchange partner and the display of card data items can be automatically matched with each other, and the correct correspondence between the partner and the card data enables a smooth business talk after the card exchange.

(Embodiment 3)

A card exchange device and a card exchange method according to a third embodiment will be described with reference to FIGS. 5 and 7.

The structure and operation according to the third embodiment are almost the same as those in the second embodiment, and thus descriptions of common parts will be omitted.

FIG. 5 is a block diagram illustrating hardware of a card exchange device 11 according to the third embodiment.

In the third embodiment, under control of the image input control means 501, the image input part 502 takes an image of a seating state of partners with whom cards have been exchanged at the card exchange for the number of times not exceeding the number of partners with whom the cards have been exchanged so as to include face images of all the card exchange partners, as well as takes face images of partners with whom the cards have been exchanged.

Further, the control part 101 judges a seating position of a card exchange partner from face images taken at the face image taking and face images taken at the seating state image taking, as well as makes the judged seating position of the card exchange partner and a display position of card data to be displayed on the display screen correspond to each other.

Hereinafter, a flow of the card exchange in the card exchange device 11 constructed as described above will be described with reference to FIGS. 5 and 7.

Figure 7:
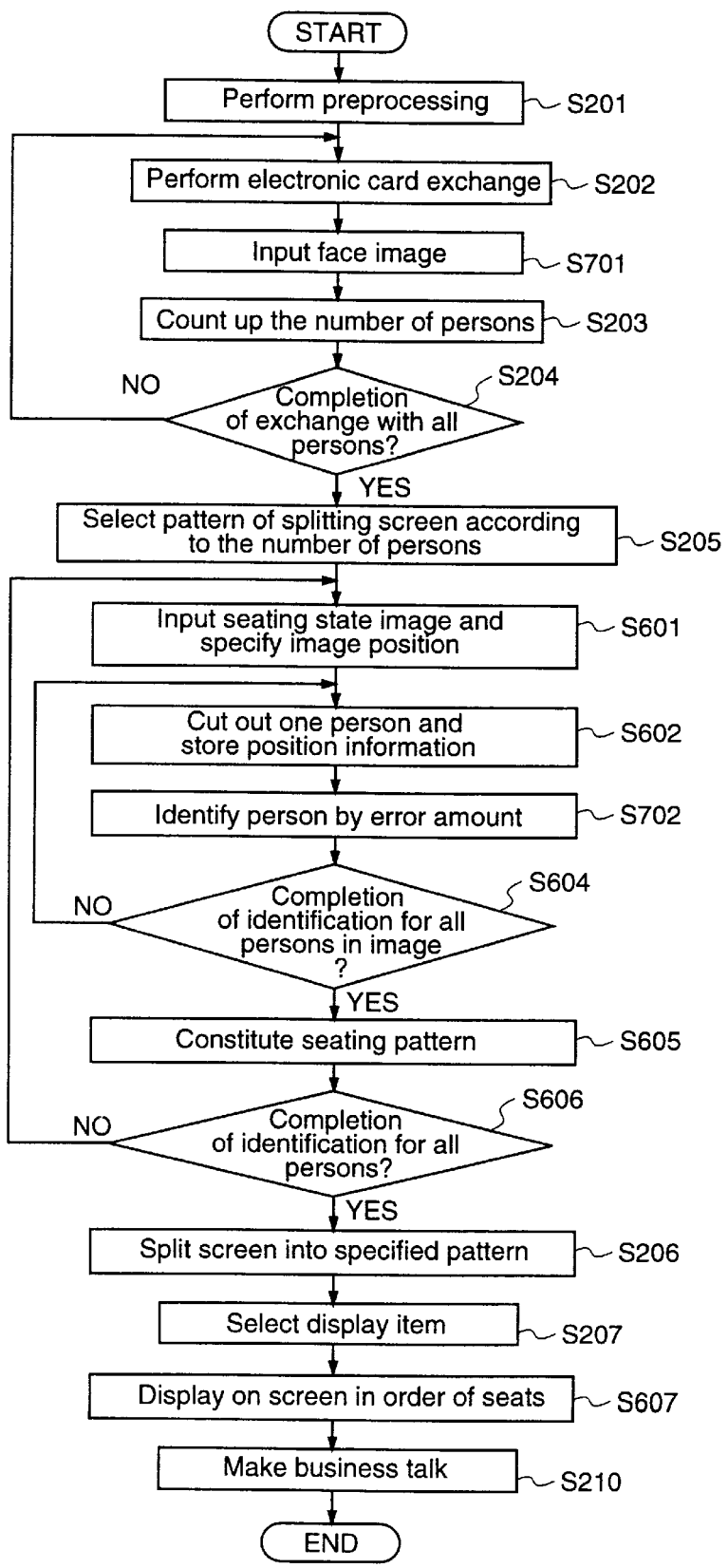
FIG. 7 is a flowchart showing a processing procedure of a card exchange device according to a third embodiment of the present invention.

FIG. 7 is a flowchart showing a processing procedure of the card exchange device 11 according to the third embodiment. In step S202 in the second embodiment, face image data are always exchanged as the card data together with attribute data, while it is not always required to exchange face image data in the third embodiment because received face image data are not employed for person identification which will be described later. Instead, a face image of a card exchange partner is taken and stored in the auxiliary storage part 105 (Step S701). The face image is taken by using the image input part 502 so that an appropriate face image can be stored. Further, the image taking is performed by operating the input part 102 at an appropriate timing while the taken image data is being displayed on the display screen.

Next, the person identification using the amount of errors is performed (Step S702). The person identification using the error amount is performed by employing the face image data taken at the card exchange in Step S701 and face image data cut out in Step S602. These two pieces of face image data are taken at timings in which a lapse of time can be almost neglected. Therefore, there is no need to consider changes with time or changes in hairstyle or the like. Further, the person identification is always performed only for the card exchange partners. The sizes of two pieces of face image data are normalized by an area that is obtained from an outline, and a normalized and squared error amount is obtained, to perform person identification on the basis of the error amount.

Thereafter, like in the second embodiment, the person identification is performed by the number of partners whose cards have been received, and data of the card exchange partner is displayed at a position corresponding to the seating state on the display screen on the basis of the result of the person identification.

As described above, according to the card exchange device of the third embodiment, the image input part 102 takes an image of a seating state of partners with whom cards have been exchanged at the card exchange for the number of times not exceeding the number of persons with whom the cards have been exchanged, so as to include face images of all the card exchange partners, as well as takes only face images of partners with whom the cards have been exchanged, and the control part 101 judges a seating position of a card exchange partner from the face image taken at the face image taking time and the face image taken at the seating state image taking time, as well as makes the judged seating position of the card exchange partner and a display position of the card data to be displayed on the display screen correspond to each other. Accordingly, there is no need to perform a complicated processing such as feature extraction and pattern recognition, whereby an extremely high-accuracy person identification is enabled only by the normalization in size and the error amount. Therefore, a seating state of a card exchange partner and a display of the card data items can be matched with each other by a simpler operation, and the correct correspondence between the card exchange partner and the card data enables a smooth business talk after the card exchange.

(Embodiment 4)

A card exchange device and a card exchange method according to a fourth embodiment will be described with reference to FIGS. 1, 8 and 9.

Since the structure and operation according to the fourth embodiment are almost the same as those in the first embodiment, descriptions of common parts will be omitted.

FIG. 1 is a block diagram illustrating hardware of a card exchange device 11 according to the fourth embodiment. FIG. 8 is a flowchart showing a processing procedure of the card exchange device 11 according to the fourth embodiment. FIG. 9 is a diagram showing an example of a display of a mark which indicates that it is a partner with whom card exchange is not performed yet.

In the first embodiment, under control of the display control part 107, the display part 108 displays card data of partners with whom cards have been exchanged as well as, when there is a partner whose card data to be displayed does not exist because the cards have not been exchanged yet, the part 108 displays a mark indicating that cards are not exchanged yet on the display screen so as to correspond to a seating position of the partner.

Therefore, the card exchange device according to the fourth embodiment is effective when there is at least one business-talking partner with whom cards were exchanged in the past and are not exchanged this time.

A flow of card exchange in the card exchange device 11 constructed as described above will be described with reference to FIGS. 1 and 8.

Figure 8:
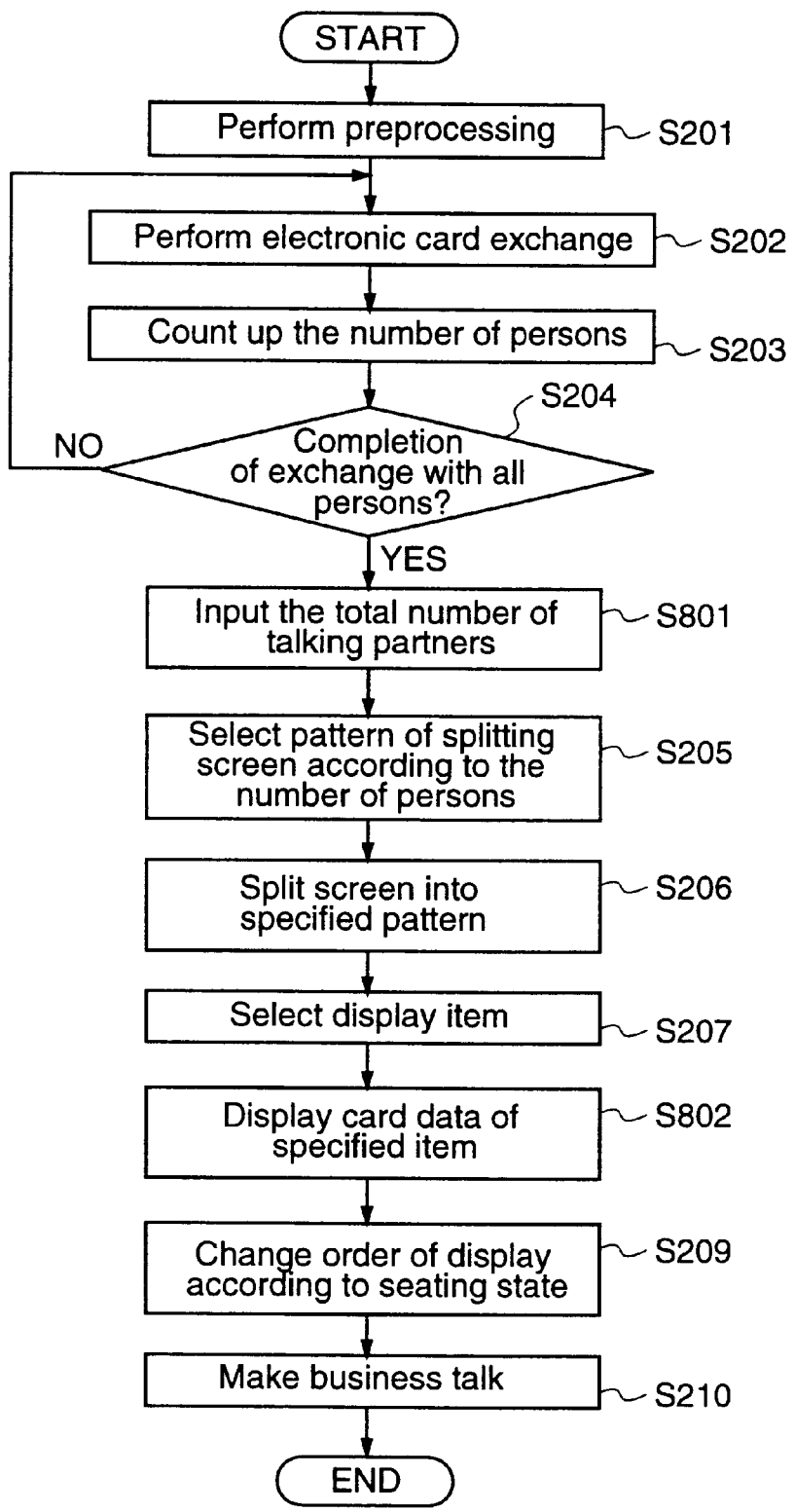
FIG. 8 is a flowchart showing a processing procedure of a card exchange device according to a fourth embodiment of the present invention.

In FIG. 8, initially, card exchange is performed in the processes from Steps S201 to S204, and when the processing proceeds to Step S801, the head counter 109 has counted only the number of partners with whom cards have been exchanged. Thus, when there is a partner with whom the cards are not exchanged this time, a seating state and displayed card data cannot be made to positionally correspond to each other by the following processing. In this fourth embodiment, the total number of talking partners is inputted from the input part 102 and temporarily stored in the main storage part 104 (Step S801). The number of persons with whom cards have been exchanged, which is stored in the head counter 109, is also temporarily stored at another address of the main storage part 104. Thereafter, the total number of talking partners is read into the head counter 109. Therefore, the processing in each step from Steps S205 to S207 is performed on the basis of the total number of talking partners. In the next Step S802, card data of specified items are displayed. Initially, by referring to the number of partners with whom cards have been exchanged, which is temporarily stored in the main storage part 104, the card data of the specified items are selected from the card data obtained by the card exchange and displayed in the order of the card exchange. Further, in Step S802, the number of partners with whom the cards have been exchanged is subtracted from the total number of talking partners which is temporarily stored in the main storage part 104, and the obtained number of marks indicating that card exchange is not performed yet are displayed as shown in FIG. 9. Thereafter, the seating position and the display of card data displayed on the display screen are adjusted in Step S209 so as to positionally correspond to each other.

As described above, according to the card exchange device of the fourth embodiment, when there is a partner whose card data to be displayed does not exist because cards are not exchanged, the display part 108 displays a mark indicating that cards are not exchanged yet on the display screen so that it corresponds to the seating position of that partner. Thereby, even when there is a partner with whom cards are not exchanged yet, the seating state and the display of card data can be made to positionally correspond to each other correctly, resulting in a smooth business talk after the card exchange.

Figure 9:
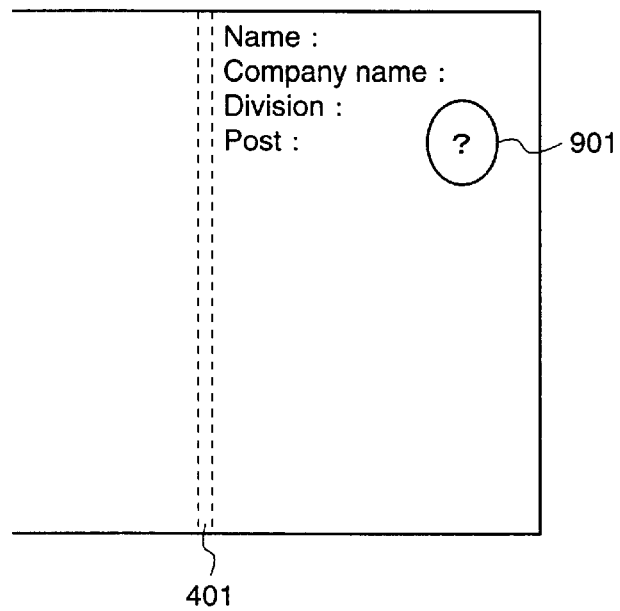
FIG. 9 is a diagram illustrating an example of a display of a mark which indicates that cards are not exchanged yet according to the fourth embodiment of the invention.

Further, since a mark 901 shown in FIG. 9 is a mark for only indicating that card exchange is not performed yet, any mark is available, and there is no problem even when data of a fictitious person is displayed as if cards have been exchanged with him.

(Embodiment 5)

A card exchange device and a card exchange method according to a fifth embodiment will be described with reference to FIGS. 10, 11 and 12.

Figure 10:
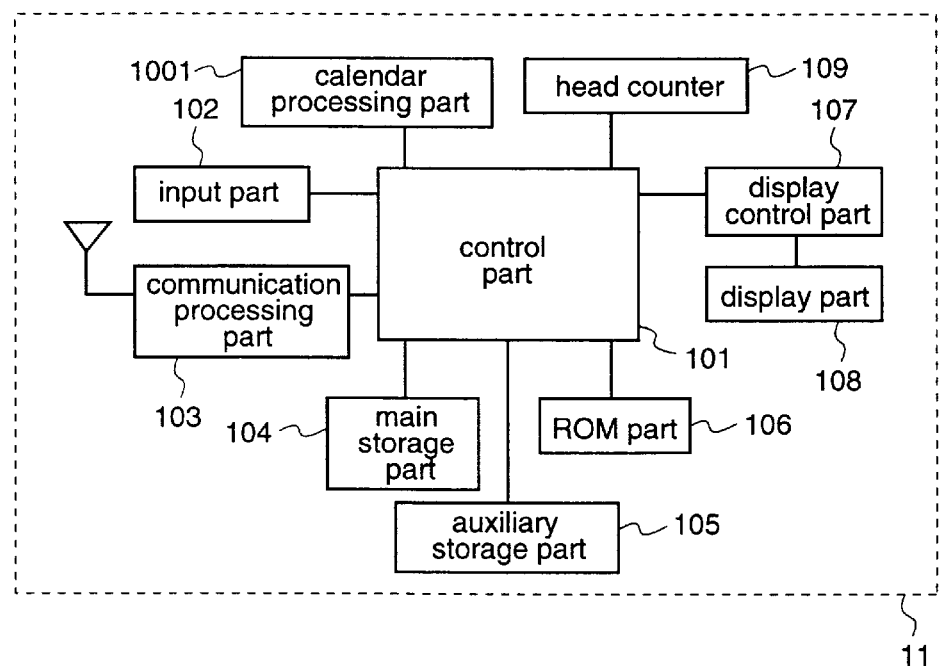
FIG. 10 is a block diagram illustrating hardware of a card exchange device according to a fifth embodiment of the present invention.

FIG. 10 is a block diagram illustrating hardware of a card exchange device 11 according to the fifth embodiment. In the figure, the same reference numerals as those in FIG. 1 denote the same or corresponding components, and their descriptions will be omitted. FIG. 11 is a flowchart showing a processing procedure of the card exchange device 11 according to the fifth embodiment.

Figure 12:
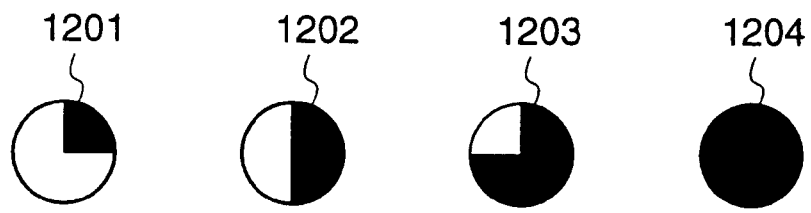
FIG. 12 is a diagram illustrating an example of a mark which indicates that a card was previously exchanged according to the fifth embodiment of the invention.

FIG. 12 is a diagram illustrating marks which indicate that this is a partner with whom cards were previously exchanged, and there are several kinds of marks according to the date and time when card exchange was performed.

The structure and operation according to the fifth embodiment are almost the same as those in the fourth embodiment, and thus descriptions of common parts will be omitted.

In FIG. 10, a calendar processing part 1001 comprises an RTC chip, a clock generator and the like, and keeps and updates the so-called date and time. The control part 101 can obtain date data and time data by accessing the calendar processing part 1001.

In the fifth embodiment, the main storage part 104 and the auxiliary storage part 105 store card data of a card exchange partner at the card exchange, as well as store the date and time of the card exchange based on the date data and time data which is obtained by the control part 101 from the calendar processing part 1001.

Further, the control part 101 reads both of the stored card data and the date and time data as required.

Under control of the display control part 107, the display part 108 displays the card data and a card-unexchanged mark as well as when a part or all of the card data are to be displayed, it displays a mark indicating that the card data have been read by the control part 101 together with the date and time data. At this time, the control part 101 changes a mark to be displayed on the display screen according to the date and time of the card exchange on the basis of the read date and time data.

Therefore, the card exchange device according to the fifth embodiment is effective when there is a business-talking partner with whom cards were exchanged in the past and there is at least one partner with whom cards are not exchanged.

A flow of the card exchange in the card exchange device 11 constructed as described above will be described with reference to FIGS. 10 and 11.

Figure 11:
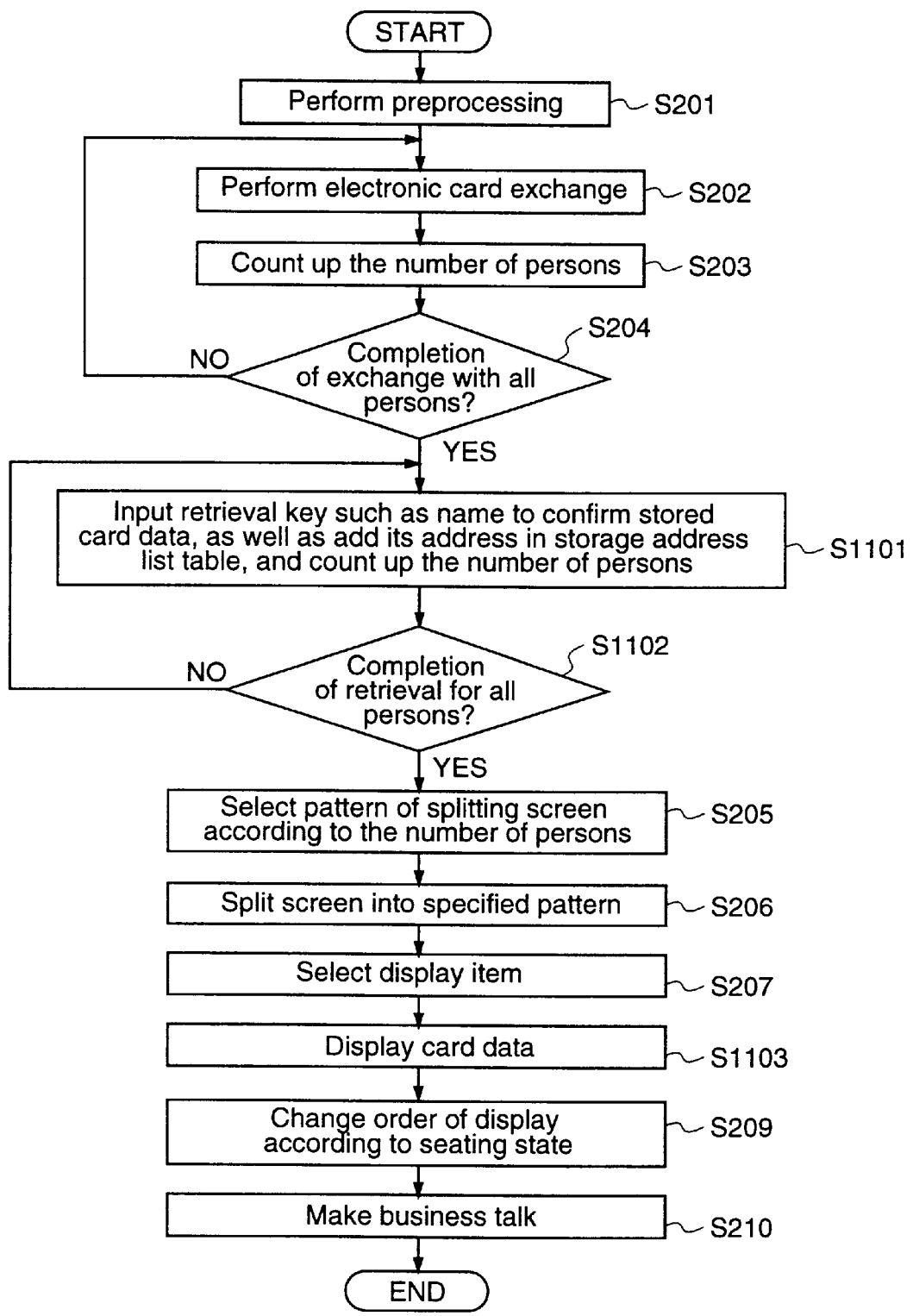
FIG. 11 is a flowchart showing a processing procedure of the card exchange device according to the fifth embodiment of the invention.

In FIG. 11, initially, the card exchange is performed by the processing from Steps S201 to S204. At the same time, the date and time as storage data from the calendar processing part 1001 are also stored as additional data. Next, a retrieval key such as name and company name is inputted to confirm that card data of a partner with whom cards are not exchanged this time are stored in the auxiliary storage part 105, as well as the storage address is additionally stored in a storage address list table in the main storage part 104, and the head counter 109 is counted up (Step S1101). When there is no card data due to misapprehension or the like, card exchange is performed again. This processing is repeated by the number of partners with whom cards are not exchanged yet (Step S1102). Next, the display of card data is prepared by the processing in each step from Steps S205 to S207, and thereafter the card data are actually displayed (Step S1103). Here, card data of partners with whom cards have been exchanged are subjected to the display process in the order of the card exchange by referring to the storage address list table in the main storage part 104 independently of the seating state. On the other hand, card data of partners with whom cards are not exchanged this time are subjected to the display process in the order of the retrieval or the like, and the date and time of the card exchange is referred to regardless of whether the date and time of the card exchange is specified as the display data items and any of the card exchange marks shown in FIG. 12 is displayed according to the date and time. For example, a card exchange mark 1201 indicates that card exchange was performed within a half year, and similarly a card exchange mark 1202 indicates that card exchange was performed within a year, a card exchange mark 1203 indicates that card exchange was performed within two years, and a card exchange mark 1204 indicates that card exchange was not performed for more than two years.

Thereafter, the seating position and the display of card data displayed on the display screen are adjusted in Step S209 to be made to positionally correspond to each other.

As described above, according to the card exchange device of the fifth embodiment, the main storage part 104 and the auxiliary storage part 105 store the date and time of card exchange as well as the card data, the control part 101 reads both of the stored card data and date and time data as required, and when a part or all of the read card data are displayed on the display screen, the display part 108 displays a mark indicating that the card data were read by the control part 101. Accordingly, when there is a partner with whom cards are not exchanged this time but were exchanged in the past, it is possible to specify the date and time of the card exchange with that partner and issue a warning that information should be updated to the latest one.

Here, the card exchange marks 1201 to 1204 merely indicate that card exchange was performed previously, and the standard for time interval is not absolute. It is naturally possible to change the mark at a time interval other than the passage of time of half a year or a year. Further, also when the mark is changed in color or size as well as in shape, the similar effect can be achieved.

(Embodiment 6)

A card exchange device and a card exchange method according to a sixth embodiment will be described with reference to FIGS. 5 and 13. FIG. 5 is a block diagram illustrating hardware of a card exchange device according to the sixth embodiment.

Figure 13:
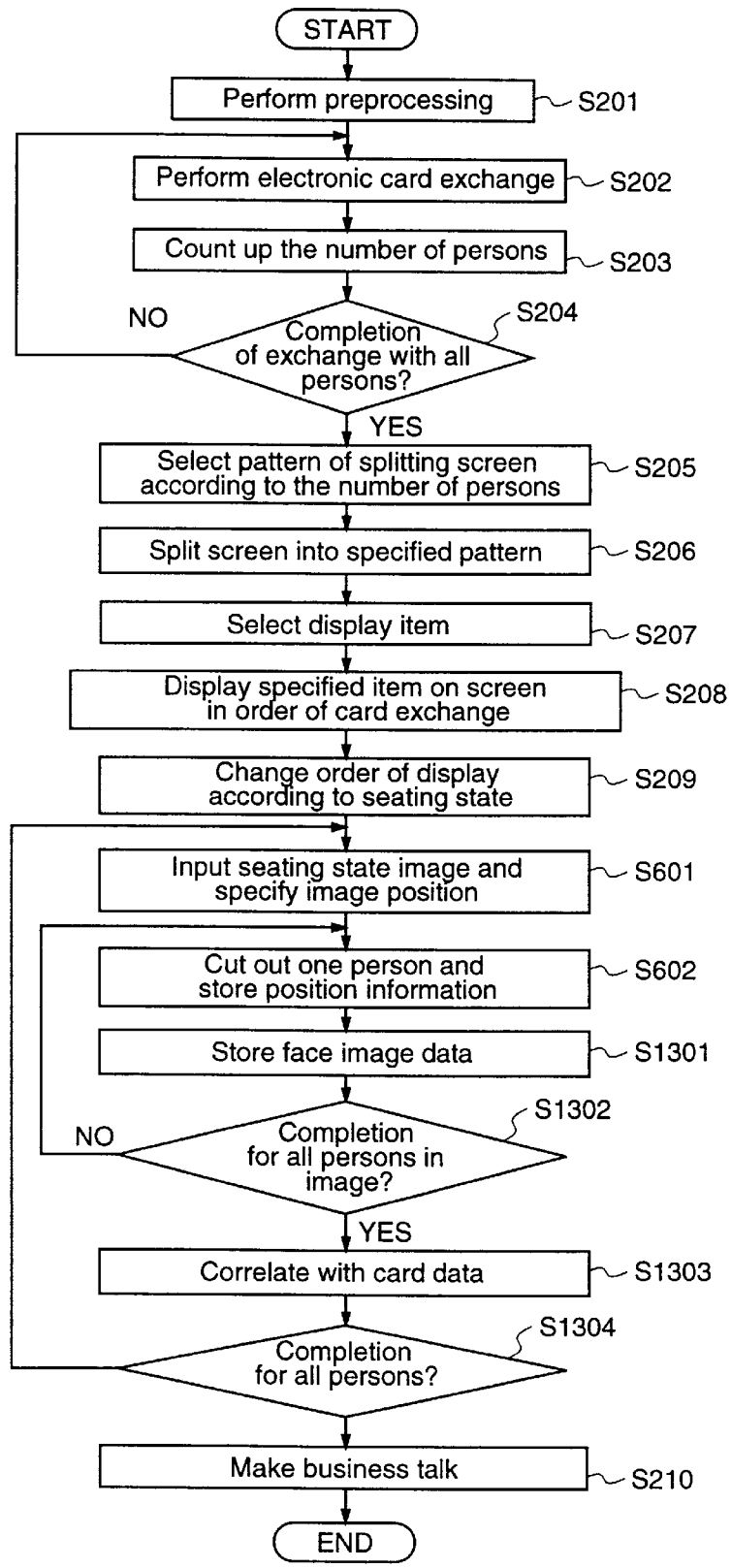
FIG. 13 is a flowchart showing a processing procedure of a card exchange device according to a sixth embodiment of the present invention.

FIG. 13 is a flowchart showing a processing procedure of the card exchange device according to the sixth embodiment.

The sixth embodiment is implemented in such a manner as to be added to the second embodiment, and thus descriptions of the parts which are common with those in the second embodiment will be omitted.

In the sixth embodiment, under control of the image input control part 501, an image of the seating state of partners with whom cards have been exchanged is taken by the image input part 502 for the number of times not exceeding the number of partners with whom cards have been exchanged so as to include face images of all the card exchange partners.

The control parts 101 cuts out the face image of each person from the images taken at the seating state image taking.

The main storage part 104 and the auxiliary storage part 105 store card data as well as store the face images cut out by the control part 101.

Further, the control part 101 makes the cutout face image and the stored card data correspond to each other.

A flow of the card exchange in the card exchange device 11 constructed as described above will be described with reference to FIGS. 5 and 13.

In the second embodiment, it is supposed that face image data are transferred together with attribute data as card data at the electronic card exchange in Step S202 shown in FIG. 6, while in the sixth embodiment, it is supposed that face image data having a large amount of data and taking much time to be transferred are not transferred. Thus, only attribute data that is text-type data such as name and division is exchanged at the electronic card exchange in Step S202. Even when display of face image data is specified in Step S207, there is no face image data in Step S208 and thus the face image data cannot be displayed at this point of time. However, at the time when the processing of Step S209 is completed, the display of attribute data positionally corresponding to the seating state has been completed.

Next, after the display of the card data is completed, seating state images are inputted by employing the image input part 502 and are temporarily stored in the auxiliary storage art 105 in Step S601, as described in the second embodiment. Then, in Step S602, the face image of one person is cut out and stored together with position information as face image data. A method for cutting out a face image is already described in the second embodiment and accordingly its description is omitted. Since this cutout face image is stored together with the attribute data as face image data at the card exchange, it is cut out as a rectangular image which includes not only the inside of the outline of one face but also a part of hair or clothes. Next, the face image data are temporarily stored in the auxiliary storage part 105 (Step S1301). Since the correlation between the face image data and the attribute data cannot be established at this time, it is required to temporarily store the face image data. The processing returns to Step S602 as required to perform cutting-out for all the persons in the inputted image (Step S1302). Next, the face image data and the attribute data are correlated with each other. It is already known who is seated at which position in the processes up to Step S209, and which part of the whole seating pattern is image-taken is known in Step S601. Therefore, when the positional relationship of persons in the taken image is further known, it is possible to find to whom cutout face image data belongs, that is, to correlate the face image data with the attribute data obtained by the card exchange. Then, the positional relationship of persons is obtained by employing the position information stored in Step S602, and the attribute data and the cutout face image data are correlated with each other so that the cutout face image data can be processed in the identical manner to that shown in the first embodiment in which face image data are received with the card data at the electronic card exchange (Step S1303). The processing returns to Step S601 as required to repeat the same processing for all the persons with whom cards have been exchanged (Step S1304).

As described above, according to the card exchange device of the sixth embodiment, the image input part 102 takes an image of the seating state of partners with whom cards have been exchanged for the number of times not exceeding the number of partners with whom cards have been exchanged, so as to include face images of all the card exchange partners, the control part 101 cuts out the face image of each person from the images taken at the seating state image taking time, the main storage part 104 and the auxiliary storage part 105 store the cutout face images as well as card data, and the control part 101 makes the cutout face image and the stored card data correspond to each other. Thereby, the troubles of exchanging face image data having a large amount of data and taking much time to be transferred when cards are exchanged, or of taking a face image of a card exchange partner every time cards are exchanged can be saved, whereby card exchange can be performed by fewer operations.

(Embodiment 7)

A card exchange device and a card exchange method according to a seventh embodiment will be described with reference to FIGS. 1, 14 and 15.

FIG. 1 is a block diagram illustrating hardware of a card exchange device 11 according to the seventh embodiment.

Figure 14:
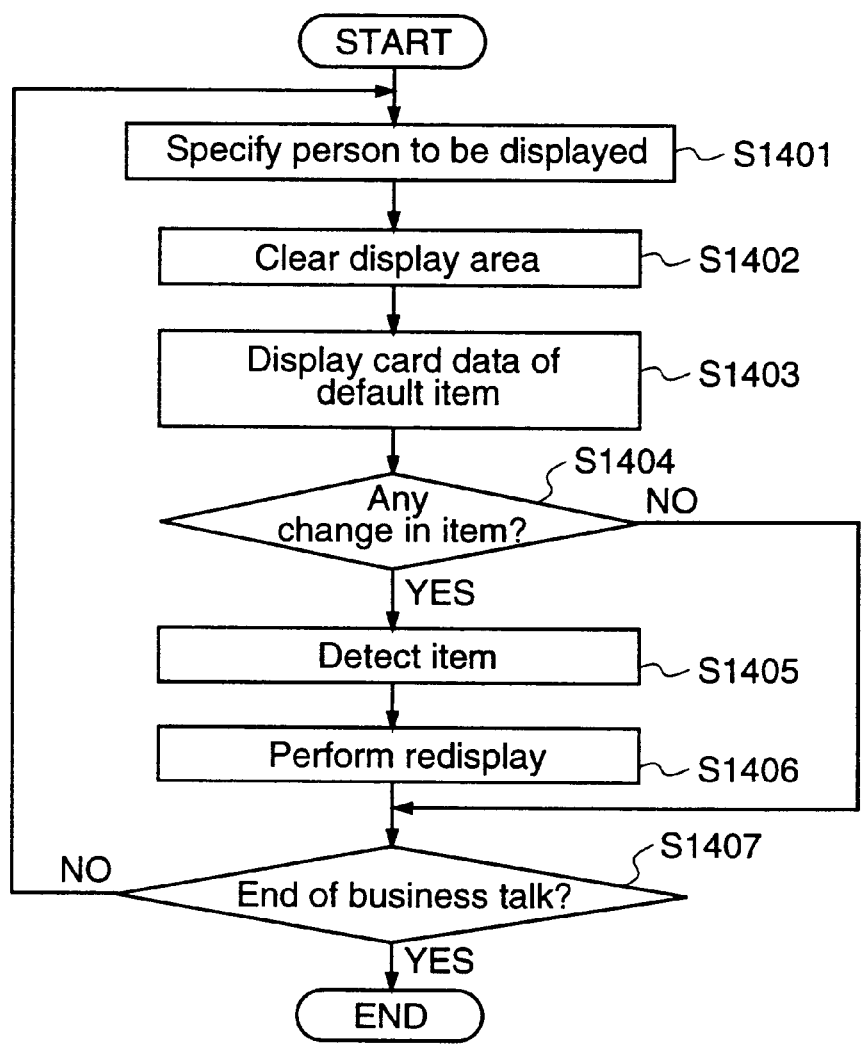
FIG. 14 is a flowchart showing a processing procedure of a card exchange device according to a seventh embodiment of the present invention.

FIG. 14 is a flowchart showing a processing procedure of the card exchange device 11 according to the seventh embodiment.

The seventh embodiment is implemented in such a manner as to be added to the first embodiment, and accordingly descriptions of the parts which are common with those in the first embodiment will be omitted.

In the seventh embodiment, the display part 108 displays part of card data of each person which is received in accordance with the display control part 107, by plural persons only on a part of the display screen, and displays part or all of card data of specified card exchange partners on the rest of the display screen.

A flow of the card exchange in the card exchange device 11 constructed as described above will be described with reference to FIGS. 1 and 14.

In the first embodiment, part or all of card data of the card exchange partners are displayed so that the same items are displayed for each card exchange partner without any distinction. Therefore, as the number of card exchange partners increases, items which can be displayed are decreased and then the amount of information about each card exchange partner is reduced, resulting in difficulties in smooth business talk in some cases. In this seventh embodiment, a speaker is specified and information of the speaker is displayed selectively. Therefore, when a pattern for splitting the screen according to the number of persons is selected in Step S205 of the first embodiment, a type of display pattern is selected in which the display screen is divided into a part where data of all the card exchange partners are displayed and a part where data of a specified partner are displayed, as shown in FIG. 15. An area splitting line 1501 is a splitting line that indicates a boundary between an area part where data of all the card exchange partners are displayed and an area part where data of a specified partner are displayed, and the area below the area splitting line 1501 is an area where data of a specified person are displayed.

In the seventh embodiment, the processes from Steps S201 to S209 described in the first embodiment are performed first. However, at this time, no one is particularly specified, and thus no data is displayed yet in the area below the area splitting line 1501 in FIG. 15.

Next, a person who is to be displayed is specified from the card exchange partners during the business talk (Step S1401). The input is performed by pointing one of the card exchange partners displayed in an area above the area splitting line 1501 by using an input device of the input part 102. Normally, a speaker who is making remarks or a partner to whom one wants to speak next is specified. Next, the display in the area below the area splitting line 1501 is cleared (Step S1402). Then, attribute data of items which are previously specified as a default or face image data of the specified person are read from the auxiliary storage part 105 and displayed on the display screen (Step S1403). The area below the area splitting line 1501 is quite large and enables display of much information. Therefore, when an item other than the default is to be displayed, while the items of the default are enough in most cases, that item to be displayed is specified (Step S1405) and redisplay is performed (Step S1406). When items are not changed, the processing proceeds to Step S1407 and then returns to Step S1401 until the business talk is ended to wait for the next specification.

As described above, according to the card exchange device of the seventh embodiment, when there are so many persons with whom cards have been exchanged that much data of all the persons cannot be displayed on the display screen of the card exchange device, the display part 108 displays part of card data of all the persons on a part of the screen so as to correspond to the displayed positions, and displays data of a specified speaker selectively on the rest of the display part. Therefore, it is possible to display data of all the persons so as to correspond to the displayed positions while obtaining detailed information of the specified partner when needed, whereby smooth business talks can be made under correct recognition.

(Embodiment 8)

Figure 16:
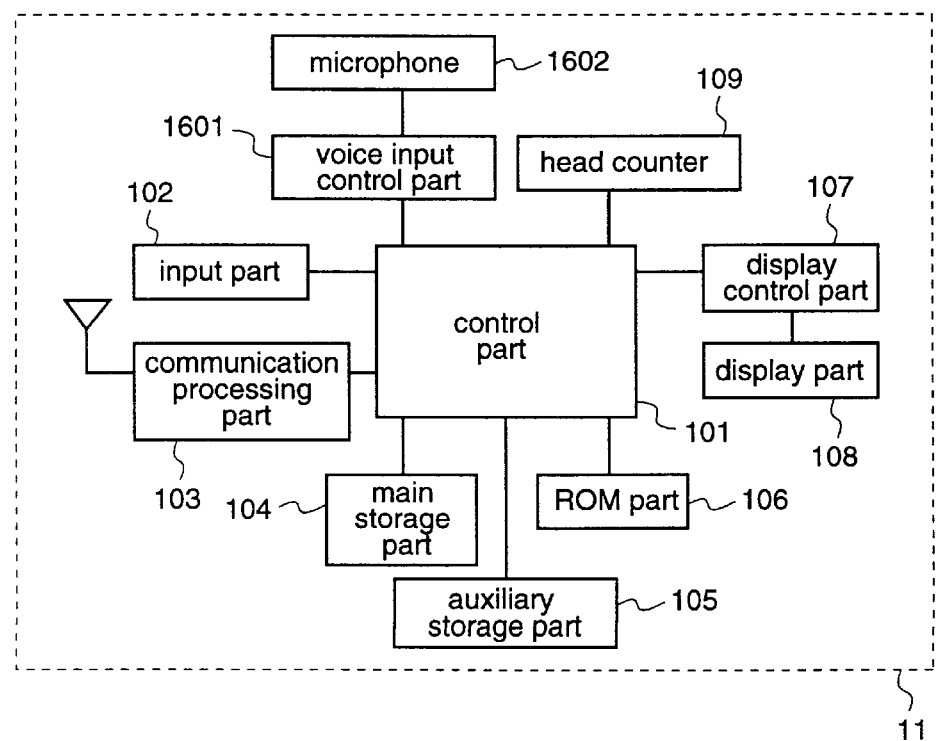
FIG. 16 is a block diagram illustrating hardware of a card exchange device according to an eighth embodiment of the present invention.

A card exchange device and a card exchange method according to an eighth embodiment will be described with reference to FIGS. 16, 17 and 18. FIG. 16 is a block diagram illustrating hardware of a card exchange device 11 according to the eighth embodiment. In the figure, descriptions of the same components as those in FIG. 1 will be omitted.

Figure 17:
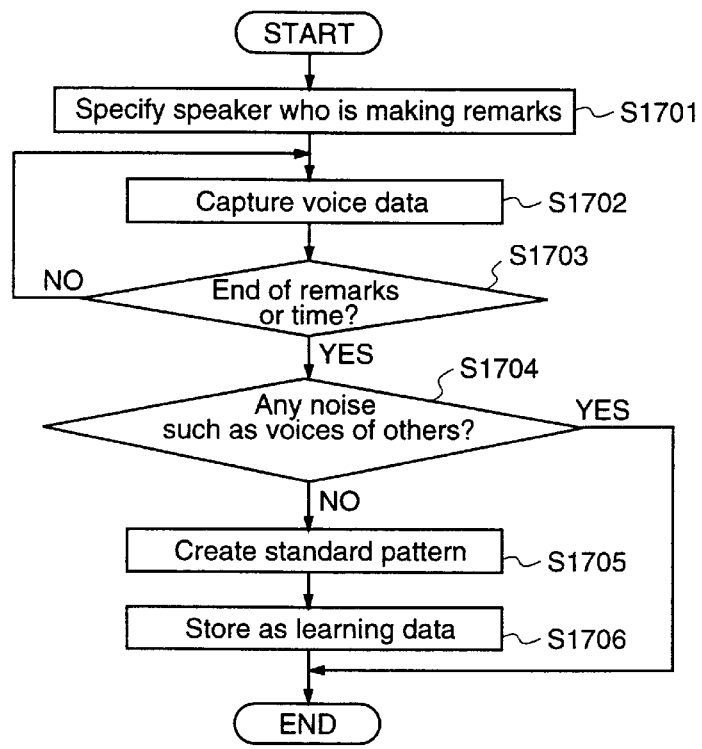
FIG. 17 is a flowchart showing a processing procedure of the card exchange device according to the eighth embodiment of the invention.
Figure 18:
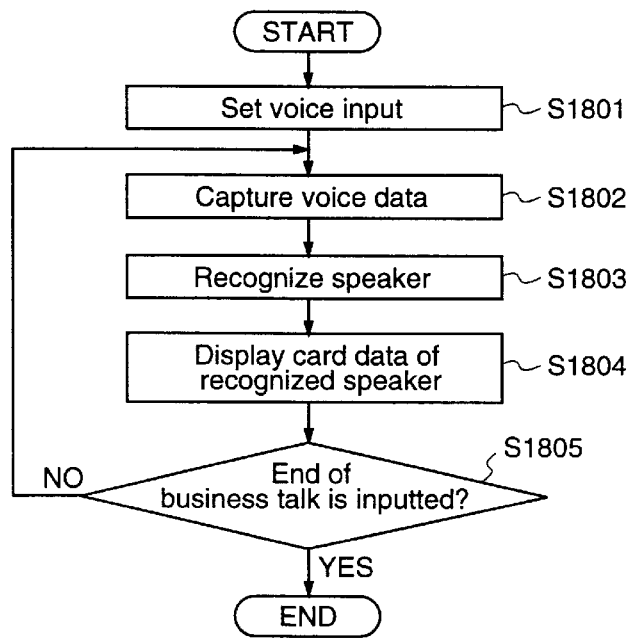
FIG. 18 is a flowchart showing a processing procedure of the card exchange device according to the eighth embodiment of the invention.

FIGS. 17 and 18 are flowcharts showing processing procedures of the card exchange device 11 according to the eighth embodiment.

The eighth embodiment is implemented in such a manner as to be added to the seventh embodiment, and accordingly descriptions of the parts which are common with those in the seventh embodiment will be omitted.

In FIG. 16, a microphone 1602 inputs voice. A voice control part 1601 comprises an analog amplifier, a sample holder, an AD converter, a memory buffer and the like, and converts voice data to digital data and temporarily buffers the digital data in accordance with a command from the control part 101.

In the eighth embodiment, the main storage part 104 and the auxiliary storage part 105 store card data of card exchange partners as well as store voice data of card exchange partners which are buffered by the voice input control part 1601 as standard data.

Further, the control part 101 recognizes a speaker on the basis of the stored standard data and voice data of the speaker.

The display part 108 selects required data to be displayed among card data of the recognized speaker and displays the data on the display screen in accordance with the display control part 107.

A flow of the card exchange in the card exchange device 11 constructed as described above will be described with reference to FIGS. 16, 17 and 18.

In the seventh embodiment, a person to be displayed is specified to selectively display card data of a specified person while in the eighth embodiment, a speaker is recognized by voice and card data of the speaker are displayed selectively. Since it is difficult to previously collect data of a speaker and spoken contents cannot be restricted, the voice recognition to be used at business talk after the card exchange is categorized as speaker recognition of a spoken content independent type, and requires learning at the business talk. As a method for specifying a speaker in short-time speaking, a method is commonly known which creates several tens of standard patterns corresponding to phonemes and calculates distances to parameters extracted from a voice wave at short time periods, and for example an advanced speaker recognition method is proposed in Japanese Published Patent Application No. Hei. 5-323990. In the eighth embodiment, detailed contents of the speaker recognition are not an essential issue and thus their description will be omitted. In the present invention, the probability of the speaker recognition may not necessarily be high as described later.

To perform the speaker recognition, a learning step of storing voice data of each card exchange partner as a standard pattern is required. Thus, only the speaker is specified in the process of Step S1701 in the eighth embodiment. The following processes for displaying the card data are performed as those in the seventh embodiment, and a process for the learning is performed as an internal processing in parallel to the displaying process. This internal processing for the learning will be described with reference to FIGS. 16 and 17.

First, a speaker is specified by employing an input device of the input part 102 (Step S1701), whereby capturing of voice data is started (Step S1702). The voice is amplified, A/D converted, and stored in a buffer by the voice input control part 1601 through the microphone 1602. The collected and digitized voice data are stored in the main storage part 104 while it may be transferred to the auxiliary storage part 105 as required. The collection of the voice data is performed until remarks of the speaker is completed or for an appropriate period of time (Step S1703). When voice of other speakers are included in voice data when the voice data is converted into standard data which is employed for the speaker recognition, the probability of the recognition is significantly reduced. Thus, when it is supposed that voice of others or other noises are included while the speaker is making remarks, the data are abandoned (Step S1704). When it can be judged that the voice has no special problem, a standard pattern is created (Step S1705) and this standard pattern is stored in the auxiliary storage part 105 as learning data for each speaker (Step S1706). Here, only a standard pattern of the user own voice is previously created and stored.

When the above-described processing is repeated for an appropriate number of times to perform the learning, the speaker recognition is enabled. The processing of speaker recognition will be described with reference to FIGS. 16 and 18. Here, this processing does not define a specific method of the speaker recognition and can be used for general purposes.

First, the card exchange device is set so that voice is always sampled from the microphone 1602 through the voice input control part 1601 (Step S1801). When a speaker begins remarking, capturing of the voice data is started (Step S1802). When the voice data are collected for a proper period, a speaker recognition process is performed (Step S1803). Normally, a standard pattern for a candidate card exchange partner is read from the auxiliary storage part 105 into the main storage part 104 as required, while a distance to the standard pattern is calculated and a candidate with the smallest distance is decided as the speaker. Then, when the candidate recognized as the speaker is a card exchange partner other than the user, the card data are read from the auxiliary storage part 105 and displayed on the display screen, that is, in an area below the area splitting line 1501 in FIG. 15 (Step S1804). The processing returns to Step S1802 to repeat the above-described processes until business talks are ended.

As described above, according to the card exchange device of the eighth embodiment, the voice input control part 1601 converts voice inputted from the microphone 1602 into voice data, the main storage part 104 and the auxiliary storage part 105 store card data as well as store the voice data as standard data, the control part 101 recognizes a speaker from the stored standard data and voice data of the speaker, and the display part 108 selects required data to be displayed among the card data of the recognized speaker so as to display the same on the display screen. Therefore, when there is so many persons with whom cards have been exchanged that data of all the persons cannot be displayed on the display screen of the card exchange device, part of card data of all the persons is displayed on a part of the screen in a state where the data is positionally corresponded, and data of a specified speaker are selectively displayed on the rest of the display part, whereby it is possible to make data of all the persons correctly correspond in position and to obtain detailed information of the specified partner when needed, and smooth business talks under correct recognition can be realized only by a simple operation.

Figure 15:
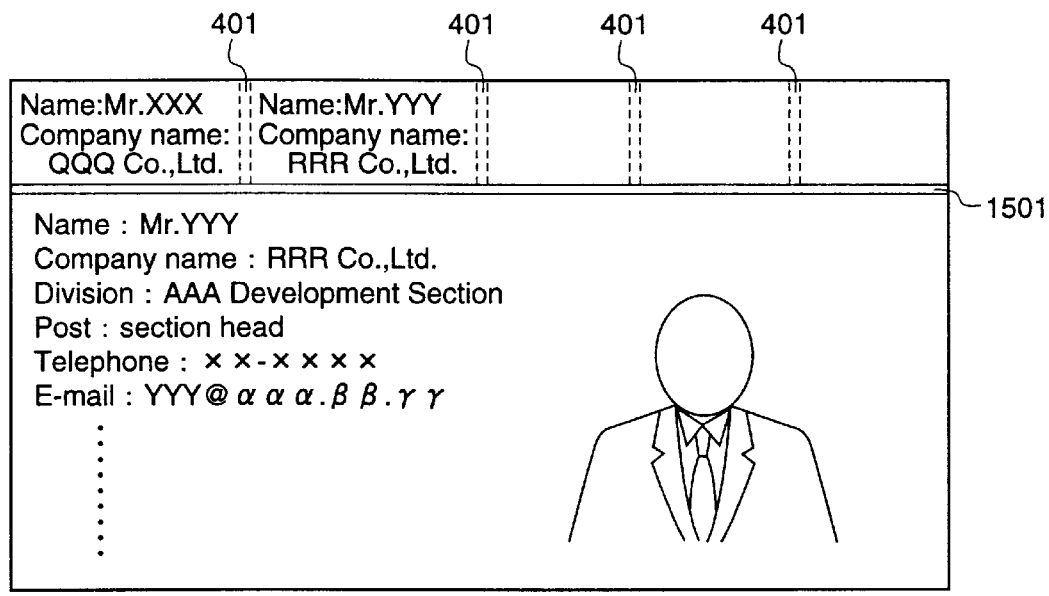
FIG. 15 is a diagram illustrating an example of a display of the card exchange device according to the seventh embodiment of the invention.

As apparent from the description of the seventh embodiment, on the display screen of the card exchange device, part of card data of all the card exchange partners is always displayed in a part above the area splitting line 1501 corresponding to the seating state as shown in FIG. 15, and the operator of the card exchange device can always recognize a right speaker. Therefore, even when speaker recognition provides a wrong result and card data of a person who is different from the speaker are displayed, it is immediately found that the displayed card data are wrong, and thus the wrong display does not interfere with the business talks. Further, when needed, it is also possible to display card data of a card exchange partner which is specified from the input part 102 as shown in the seventh embodiment.

Further, voice data are always sampled from the microphone 1602 through the voice input control part 1601, and it is found quite easy to subject the voice data converted into digital data to compression such as MPEG and store the compressed data in the auxiliary storage part 105. Since the voice data tend to have a relatively large data amount, it is also possible that conversations during the business talk are recorded in another recording device such as a tape, and only a required part is correlated with the card data after business talks are ended, or that voice data are transferred to a large-scale server through a mobile phone or the Internet when needed, and only a required part is correlated with the card data later.

What is claimed is:

1. A card exchange device which exchanges card data with plural devices in an electronic manner, said card exchange device comprising:
    a card data display device operable to simultaneously display at least part of received card data for each of plural persons on a display screen at a time of card exchange;
    a display screen dividing device operable to divide the display screen into blocks in accordance with a number of persons with whom cards have been exchanged; and a specification device operable to specify the card data displayed by said card data display device within the blocks.

2. The card exchange device as defined in claim 1, further comprising:
   a card data receiving device operable to receive the card data at the time of card exchange; and
   a card data storage device operable to store the card data received by said card data receiving device by the number of persons with whom cards have been exchanged;
   wherein said specification device is operable to specify required data to be displayed among the card data which is stored in said card data storage device, and specify an order and a position of displaying the required card data to be displayed; and
   wherein said card data display device is operable to display the data to be displayed, which are specified by said specification device, on the display screen.

3. The card exchange device as defined in claim 2, wherein:
   said card data receiving device is operable to receive attribute data information about a person, the attribute data information comprising at least one of a name, an address, a division, a telephone number, a name of a belonging group, and a post, and receive face image data as the card data, at a time of card exchange;
   said card exchange device further comprising:
   a seating state image taking device operable to take an image of a seating state of persons with whom cards have been exchanged for a number of times not exceeding the number of persons with whom cards have been exchanged, after the card exchange, so as to include face images of all the card exchange persons;
   a judgement device operable to judge a seating position of a card exchange person from the face image data received by said card data receiving device and the face images taken by said seating state image taking device; and
   a device operable to make the seating position of the card exchange person judged by said judgement device and a display position of the card data to be displayed on the display screen correspond to each other.

4. The card exchange device as defined in claim 2, further comprising:
   a seating state image taking device operable to take an image of a seating state of persons with whom cards have been exchanged for a number of times not exceeding the number of persons with whom cards have been exchanged, after the card exchange, so as to include face images of all the card exchange persons;
   a face image taking device operable to take face images of the card exchange persons at the time of card exchange;
   a judgement device operable to judge a seating position of a card exchange person from the face image taken by said face image taking device and the face images taken by said seating state image taking device; and
   a device operable to make the seating position of the card exchange person judged by said judgement device and a display position of the card data to be displayed on the display screen correspond to each other.

5. The card exchange device as defined in claim 2, further comprising:
   a card-unexchanged mark display device operable to, when there is a person whose card data to be displayed does not exist because cards are not exchanged, display a mark indicating that cards are not exchanged yet on the display screen corresponding to a seating position of the person.

6. The card exchange device as defined in claim 2, further comprising:
   a card exchange date/time storage device operable to store a date and a time when said card data storage device stores the card data of card exchange persons at the time of the card exchange;
   a device operable to read both of the card data stored in said card data storage device and the date/time data stored in said card exchange date/time storage device;
   a reading mark display device operable to, when at least part of the read card data are displayed by said card data display device on the display screen, displaying a mark indicating that the card data were read from said card data storage device; and
   a device operable to change the mark which is displayed by the reading mark display means according to the card exchange date/time on the basis of the read date/time data.

7. A card exchange device which exchanges card data with plural devices in an electronic manner, said card exchange device comprising:
   a card data receiving device operable to receive attribute data information about a person at a time of card exchange, the attribute data information comprising at least one of a name, an address, a division, a telephone number, a name of a belonging group, and a post as card data;
   a card data storage device operable to store the card data received by said card data receiving device by the number of persons with whom cards have been exchanged;
   a specification device operable to specify required data to be displayed among the card data stored in said card data storage device as well as specify an order and a position of displaying the required card data to be displayed;
   a card data display device operable to display the data to be displayed, which are specified by said specification device, on a display screen;
   a seating state image taking device operable to take an image of a seating state of persons with whom cards have been exchanged for a number of times not exceeding the number of persons with whom cards have been exchanged, after the card exchange, so as to include face images of all the card exchange persons;
   a device operable to cut out a face image of each person from the images taken by said seating state image taking device;
   a face image storage device operable to store the cutout face image; and
   a device operable to make the cutout face image and the card data stored in said card data storage device correspond to each other.

8. The card exchange device as defined in claim 2, wherein said card data display device is operable to display part of the received card data of each person by plural persons on only a part of the display screen and displays at least part of the card data of a specified card exchange person on the rest of the display screen.

9. The card exchange device as defined in claim 8, further comprising:

a standard data storage device operable to store voice data of a card exchange person as standard data; and a speaker recognition device operable to recognize a speaker from the standard data stored in said standard data storage device and voice data of the speaker;

wherein said card data display device is operable to select required data to be displayed among card data of the speaker recognized by said speaker recognition device and display the required data on the display screen.

10. The card exchange device as defined in claim 9, further comprising:

a voice data storage device operable to store voice data which has been used when a speaker is recognized by said speaker recognition device or other voice data.

11. A card exchange method which exchanges card data with plural devices in an electronic manner, said card exchange method comprising:

receiving card data at a time of card exchange;

storing the card data received in said receiving by a number of persons with whom cards have been exchanged;

dividing a display screen into blocks in accordance with a number of persons with whom cards have been exchanged;

specifying required data to be displayed among the card data stored in said storing as well as specifying an order and a position of displaying required card data to be displayed on the blocks obtained by said dividing; and displaying the data to be displayed, which are specified in said specifying, on a display screen.

12. The card exchange method as defined in claim 11, further comprising:

receiving attribute data information about a person, the attribute data information comprising at least one of a name, an address, a division, a telephone number, a name of a belonging group, and a post, and receiving face image data as card data, at a time of card exchange;

taking an image of a seating state of persons with whom cards have been exchanged for a number of times not exceeding the number of persons with whom cards have been exchanged, after the card exchange, so as to include face images of all the card exchange persons;

judging a seating position of a card exchange person from the face image data received in said receiving and the face images taken in said taking; and making the seating position of the card exchange person judged in said judging and the display position of the card data to be displayed on the display screen correspond to each other.

13. The card exchange method as defined in claim 11, further comprising:

taking an image of a seating state of persons with whom cards have been exchanged for a number of times not exceeding the number of persons with whom cards have been exchanged, after the card exchange, so as to include face images of all the card exchange persons;

taking face images of the card exchange persons at the time of card exchange;

judging a seating position of a card exchange person from the face image taken in said taking face images and the face images taken in said taking an image of the seating state; and making the seating position of the card exchange person judged in said judging and the display position of the card data to be displayed on the display screen correspond to each other.

14. The card exchange method as defined in claim 11, further comprising:

displaying, when there is a person whose card data to be displayed does not exist because cards are not exchanged, a mark indicating that cards are not exchanged yet on the display screen corresponding to a seating position of the person.

15. The card exchange method as defined in claim 11, further comprising:

storing a date and a time, when card data of a card exchange person are stored in said storing the card data, at the time of card exchange;

reading both of the card data stored in said storing the card data and the date/time data stored in said storing the data and the time;

displaying, when at least part of the read card data are displayed on the display screen in said displaying the data, a mark indicating that the card data were read from said storing the card data; and changing the mark which is displayed in said displaying the mark according to the card exchange date/time on the basis of the read date/time data.

16. A card exchange method which exchanges card data with plural devices in an electronic manner, said card exchange manner comprising:

receiving attribute data information about a person at a time of card exchange, the attribute information comprising at least one of a name, an address, a division, a telephone number, a name of a belonging group, and a post as card data;

storing the card data received in said receiving by a number of persons with whom cards have been exchanged;

specifying required data to be displayed among the card data stored in said storing as well as specifying an order and a position of displaying the required card data to be displayed;

displaying the data to be displayed, which are specified in said specifying, on a display screen;

taking an image of a seating state of persons with whom cards have been exchanged for a number of times not exceeding the number of persons with whom cards have been exchanged, after the card exchange, so as to include face images of all the card exchange persons;

cutting out a face image of each person from the images taken in said taking;

storing the cutout face image; and making the cutout face image and the card data stored in said storing the card data correspond to each other.

17. The card exchange method as defined in claim 11, wherein part of the received card data of each person are displayed by plural persons on only a part of the display screen and at least part of the card data of a specified card exchange person are displayed on the rest of the display screen in said displaying.

18. The card exchange method as defined in claim 17, further comprising:

storing voice data of a card exchange person as standard data; and recognizing a speaker from the standard data stored in said storing voice data and voice data of the speaker;

wherein required data to be displayed are selected among card data of the speaker recognized in said recognizing and are displayed on the display screen in said displaying.

19. The card exchange method as defined in claim 18, further comprising:

storing voice data used when the speaker is recognized in said recognizing or other voice data.

20. A recording medium which contains a program for making a computer execute the method defined in claim 11.

21. A recording medium which contains a program for making a computer execute the method defined in claim 12.

22. A recording medium which contains a program for making a computer execute the method defined in claim 13.

23. A recording medium which contains a program for making a computer execute the method defined in claim 14.

24. A recording medium which contains a program for making a computer execute the method defined in claim 15.

25. A recording medium which contains a program for making a computer execute the method defined in claim 16.

26. A recording medium which contains a program for making a computer execute the method defined in claim 17.

27. A recording medium which contains a program for making a computer execute the method defined in claim 18.

28. A recording medium which contains a program for making a computer execute the method defined in claim 19.

29. The card exchange device as defined in claim 1, further comprising:

a seating pattern creating device operable to create plural seating patterns according to the number of card exchange persons; and a selection device operable to select a desired seating pattern from the plural seating patterns creating by said seating pattern creating device;

wherein said specification device is operable to specify a display of desired card data in a desired position of the selected seating pattern on the display screen which is divided by said display screen dividing device.

30. The card exchange device as defined in claim 1, further comprising:

a communication processing device operable to perform radio communications with the plural devices so as to exchange the card data.

31. The card exchange device as defined in claim 7, further comprising:

a communication processing device operable to perform radio communications with the plural devices so as to exchange card data.

32. The card exchange method as defined in claim 11, further comprising:

performing radio communications with the plural devices so as to exchange the card data.

33. The card exchange method as defined in claim 11, wherein said dividing comprises:

creating plural seating patterns according to the number of card exchange persons;

selecting a desired seating pattern from the plural seating patterns; and dividing a display screen into the blocks in accordance with the selected seating pattern.

34. The card exchange method as defined in claim 16, further comprising:

performing radio communications with the plural devices so as to exchange the card data.

* * * * *